(12) United States Patent
Becker et al.

(10) Patent No.: US 8,374,118 B2
(45) Date of Patent: *Feb. 12, 2013

(54) EFFICIENT CONTROL SIGNALING OVER SHARED COMMUNICATION CHANNELS WITH WIDE DYNAMIC RANGE

(75) Inventors: Donald Wesley Becker, Rancho Santa Fe, CA (US); Nirmalkumar Velayudhan, San Marcos, CA (US); Arthur Senyue Loh, San Diego, CA (US); John Hai O'Neill, Carlsbad, CA (US); Veena Padmanabhan, Carlsbad, CA (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/558,102

(22) Filed: Jul. 25, 2012

(65) Prior Publication Data

US 2012/0287846 A1 Nov. 15, 2012

Related U.S. Application Data

(63) Continuation of application No. 12/621,203, filed on Nov. 18, 2009, now Pat. No. 8,254,303.

(60) Provisional application No. 61/115,871, filed on Nov. 18, 2008, provisional application No. 61/116,090, filed on Nov. 19, 2008.

(51) Int. Cl.
*H04B 7/185* (2006.01)

(52) U.S. Cl. .......... 370/315; 370/316; 370/322

(58) Field of Classification Search .......... None
See application file for complete search history.

(56) References Cited

U.S. PATENT DOCUMENTS

| | | | |
|---|---|---|---|
| 5,903,549 A | 5/1999 | Von der Embse et al. |
| 5,930,706 A | 7/1999 | Raith |
| 7,391,760 B1 | 6/2008 | Caldwell et al. |
| 2001/0020216 A1 | 9/2001 | Lin |
| 2002/0141356 A1 | 10/2002 | Beidas et al. |
| 2002/0191634 A1 | 12/2002 | Okamura et al. |
| 2003/0053519 A1 | 3/2003 | Gilhousen et al. |
| 2004/0125784 A1 | 7/2004 | Lee et al. |
| 2004/0252725 A1 | 12/2004 | Sun et al. |
| 2006/0126576 A1 | 6/2006 | Dale et al. |
| 2007/0015460 A1 | 1/2007 | Karabinis et al. |
| 2007/0019605 A1 | 1/2007 | Rioux et al. |
| 2007/0096788 A1 | 5/2007 | Thesling |
| 2007/0153725 A1 | 7/2007 | Waxman |
| 2007/0236770 A1 | 10/2007 | Doherty et al. |
| 2009/0154405 A1 | 6/2009 | Choi et al. |
| 2010/0128660 A1 | 5/2010 | Becker et al. |
| 2010/0128661 A1 | 5/2010 | Becker et al. |

OTHER PUBLICATIONS

PCT International Search Report and Written Opinion mailed Jun. 23, 2010; International Application No. PCT/US2009/065008, 11 pages.

PCT International Search Report and Written Opinion mailed Jun. 21, 2010; International Application No. PCT/US2009/065009, 11 pages.

(Continued)

*Primary Examiner* — Robert Scheibel

(74) *Attorney, Agent, or Firm* — Kilpatrick Townsend and Stockton LLP

(57) ABSTRACT

Embodiments provide methods, apparatuses, and systems for efficient control signaling over shared communication channels with wide dynamic range. Some embodiments includes a gateway configured to encode and to transmit multiple physical layer headers, including a first physical layer header and a second physical layer header. The first physical layer header may span a first length and represent a first modcode; the second physical layer header may span a second length and represent a second modcode. The second length may be longer than the first length. Embodiments may include multiple terminals in wireless communication with the gateway via satellite, including a first terminal configured to decode the first physical layer header and to determine the first modcode. Embodiments may include a second terminal configured to decode the second physical layer header and determine the second modcode.

25 Claims, 33 Drawing Sheets

OTHER PUBLICATIONS

International Preliminary Report on Patentability (Chapter 1 of the Patent Cooperation Treaty) of May 24, 2011 for PCT Application No. PCT/US2009/065009.

International Preliminary Report on Patentability (Chapter 1 of the Patent Cooperation Treaty) of Jun. 23, 2010 for PCT Application No. PCT/US2009/065008.

Non-Final Office Action of Feb. 29, 2012 for U.S. Appl. No. 12/621,203; 18 pages.

Non-Final Office Action of Dec. 20, 2011 for U.S. Appl. No. 12/621,220; 21 pages.

Notice of Allowance for U.S. Appl. No. 12/621,203 mailed on Apr. 26, 2012; 9 pages.

|  | Modulation Type (unspread) | | |
|---|---|---|---|
| FECFRAME size (symbols) | QPSK | 8PSK | 16APSK |
| 16200 (short) | 8100 chips<br>6 DSUs | 5400 chips<br>4 DSUs | 4050 chips<br>3 DSUs |
| 64800 (normal) | 32400 chips<br>24 DSUs | 21600 chips<br>16 DSUs | 16200 chips<br>12 DSUs |

FIG. 2

| MCP a | DSU 0 | MCP b | DSU 1 | MCP c | DSU 2 |

16APSK short FECFRAME, no spreading.
PLH consists of MCPa, MCPb, and MCPc.
The encoded FECFRAME consists of DSU 0, DSU 1, and DSU 2.

FIG. 3 A

| MCP a | DSU 0 | MCP b | DSU 1 | MCP c | DSU 2 | MCP d | DSU 3 |

8PSK short FECFRAME, no spreading.
PLH consists of MCPa, MCPb, MCPc, and MCPd.
The encoded FECFRAME consists of DSU 0, DSU 1, DSU 2, and DSU 3.

FIG. 3 B

| K spread factor (chips / symbol) | Length in chips of FECFRAME | Minimum number of DSUs per FECFRAME | Extra chips from unfilled DSU | Overhead % due to the extra chips from unfilled DSU |
|---|---|---|---|---|
| 1 | 24592 | 19 | 1058 | 4.12% |
| 2 | 49184 | 37 | 766 | 1.53% |
| 3 | 73776 | 55 | 474 | 0.64% |
| 4 | 98368 | 73 | 182 | 0.18% |
| 5 | 122960 | 92 | 1240 | 1.00% |
| 6 | 147552 | 110 | 948 | 0.64% |
| 7 | 172144 | 128 | 656 | 0.38% |
| 8 | 196736 | 146 | 364 | 0.18% |
| 9 | 221328 | 164 | 72 | 0.03% |
| 10 | 245920 | 183 | 1130 | 0.46% |
| 11 | 270512 | 201 | 838 | 0.31% |
| 12 | 295104 | 219 | 546 | 0.18% |
| 13 | 319696 | 237 | 254 | 0.08% |
| 14 | 344288 | 256 | 1312 | 0.38% |
| 15 | 368880 | 274 | 1020 | 0.28% |
| 16 | 393472 | 292 | 728 | 0.18% |
| 17 | 418064 | 310 | 436 | 0.10% |
| 18 | 442656 | 328 | 144 | 0.03% |
| 19 | 467248 | 347 | 1202 | 0.26% |
| 20 | 491840 | 365 | 910 | 0.18% |
| 21 | 516432 | 383 | 618 | 0.12% |
| 22 | 541024 | 401 | 326 | 0.06% |
| 23 | 565616 | 419 | 34 | 0.01% |

| Table Index | Modulation | Code Rate | Spread Factor | Channel Bits per symbol | BPS/Hz | FECFRAME size | $E_c/N_o$ (dB) |
|---|---|---|---|---|---|---|---|
| 1 | 16APSK | 9/10 | unspread | 4 | 3.60 | 64800 | 13.46 |
| 2 | 16APSK | 8/9 | unspread | 4 | 3.56 | 16200 | 13.61 |
| 3 | 16APSK | 5/6 | unspread | 4 | 3.33 | 64800 | 12.33 |
| 4 | 16APSK | 5/6 | unspread | 4 | 3.33 | 16200 | 12.33 |
| 5 | 16APSK | 4/5 | unspread | 4 | 3.20 | 64800 | 11.95 |
| 6 | 16APSK | 4/5 | unspread | 4 | 3.20 | 16200 | 11.95 |
| 7 | 16APSK | 3/4 | unspread | 4 | 3.00 | 64800 | 11.37 |
| 8 | 16APSK | 3/4 | unspread | 4 | 3.00 | 16200 | 11.37 |
| 9 | 16APSK | 2/3 | unspread | 4 | 2.67 | 64800 | 9.96 |
| 10 | 16APSK | 2/3 | unspread | 4 | 2.67 | 16200 | 9.96 |
| 11 | 8PSK | 2/3 | unspread | 3 | 2.00 | 64800 | 8.71 |
| 12 | 8PSK | 2/3 | unspread | 3 | 2.00 | 16200 | 8.71 |
| 13 | 8PSK | 3/5 | unspread | 3 | 1.80 | 64800 | 6.55 |
| 14 | 8PSK | 3/5 | unspread | 3 | 1.80 | 16200 | 6.55 |
| 15 | QPSK | 3/5 | unspread | 2 | 1.20 | 64800 | 4.79 |
| 16 | QPSK | 3/5 | unspread | 2 | 1.20 | 16200 | 4.79 |
| 17 | QPSK | 1/2 | unspread | 2 | 1.00 | 64800 | 1.90 |
| 18 | QPSK | 1/2 | unspread | 2 | 1.00 | 16200 | 1.90 |
| 19 | QPSK | 2/5 | unspread | 2 | 0.8 | 64800 | 0.73 |
| 20 | QPSK | 2/5 | unspread | 2 | 0.8 | 16200 | 0.73 |
| 21 | QPSK | 1/3 | unspread | 2 | 0.67 | 64800 | -0.16 |
| 22 | QPSK | 1/3 | unspread | 2 | 0.67 | 16200 | -0.16 |
| 23 | QPSK | 1/4 | unspread | 2 | 0.50 | 64800 | -1.91 |
| 24 | QPSK | 1/4 | unspread | 2 | 0.50 | 16200 | -1.91 |
| 25 | QPSK | 2/5 | 2 | 2 | 0.40 | 16200 | -2.28 |
| 26 | pi/2-BPSK | 1/3 | unspread | 1 | 0.33 | 16200 | -3.17 |
| 27 | pi/2-BPSK | 1/3 | unspread | 1 | 0.33 | 24592 | -3.17 |
| 28 | QPSK | 1/3 | 3 | 2 | 0.22 | 16200 | -4.93 |
| 29 | QPSK-S | 1/3 | 2 | 1 | 0.17 | 16200 | -6.18 |
| 30 | QPSK-S | 1/3 | 2 | 1 | 0.17 | 24592 | -6.18 |
| 31 | QPSK-S | 1/3 | 3 | 1 | 0.11 | 16200 | -7.94 |
| 32 | QPSK-S | 1/3 | 3 | 1 | 0.11 | 24592 | -7.94 |

FIG. 5A

| Table Index | Modulation | Code Rate | Spread Factor | Channel Bits per symbol | BPS/Hz | FECFRAME size | $E_c/N_o$ (dB) |
|---|---|---|---|---|---|---|---|
| 33 | QPSK-S | 1/3 | 4 | 1 | 0.08 | 16200 | -9.19 |
| 34 | QPSK-S | 1/3 | 4 | 1 | 0.08 | 24592 | -9.19 |
| 35 | QPSK-S | 1/3 | 5 | 1 | 0.07 | 16200 | -10.16 |
| 36 | QPSK-S | 1/3 | 5 | 1 | 0.07 | 24592 | -10.16 |
| 37 | QPSK-S | 1/3 | 7 | 1 | 0.05 | 16200 | -11.62 |
| 38 | QPSK-S | 1/3 | 7 | 1 | 0.05 | 24592 | -11.62 |
| 39 | QPSK-S | 1/3 | 9 | 1 | 0.04 | 16200 | -12.71 |
| 40 | QPSK-S | 1/3 | 9 | 1 | 0.04 | 24592 | -12.71 |
| 41 | QPSK-S | 1/3 | 11 | 1 | 0.03 | 16200 | -13.59 |
| 42 | QPSK-S | 1/3 | 11 | 1 | 0.03 | 24592 | -13.59 |
| 43 | QPSK-S | 1/3 | 14 | 1 | 0.02 | 16200 | -14.63 |
| 44 | QPSK-S | 1/3 | 14 | 1 | 0.02 | 24592 | -14.63 |
| 45 | QPSK-S | 1/3 | 18 | 1 | 0.02 | 16200 | -15.72 |
| 46 | QPSK-S | 1/3 | 18 | 1 | 0.02 | 24592 | -15.72 |
| 47 | QPSK-S | 1/3 | 23 | 1 | 0.01 | 16200 | -16.79 |
| 48 | QPSK-S | 1/3 | 23 | 1 | 0.01 | 24592 | -16.79 |

FIG. 5B

| Codeword Index | Walsh Sequence |
|---|---|
| 0 | 00000000000000000000000000000000 |
| 1 | 01010101010101010101010101010101 |
| 2 | 00110011001100110011001100110011 |
| 3 | 01100110011001100110011001100110 |
| 4 | 00001111000011110000111100001111 |
| 5 | 01011010010110100101101001011010 |
| 6 | 00111100001111000011110000111100 |
| 7 | 01101001011010010110100101101001 |
| 8 | 00000000111111110000000011111111 |
| 9 | 01010101101010100101010110101010 |
| 10 | 00110011110011000011001111001100 |
| 11 | 01100110100110010110011010011001 |
| 12 | 00001111111100000000111111110000 |
| 13 | 01011010101001010101101010100101 |
| 14 | 00111100110000110011110011000011 |
| 15 | 01101001100101100110100110010110 |
| 16 | 00000000000000001111111111111111 |
| 17 | 01010101010101011010101010101010 |
| 18 | 00110011001100111100110011001100 |
| 19 | 01100110011001101001100110011001 |
| 20 | 00001111000011111111000011110000 |
| 21 | 01011010010110101010010110100101 |
| 22 | 00111100001111001100001111000011 |
| 23 | 01101001011010011001011010010110 |
| 24 | 00000000111111111111111100000000 |
| 25 | 01010101101010101010101001010101 |
| 26 | 00110011110011001100110000110011 |
| 27 | 01100110100110011001100101100110 |
| 28 | 00001111111100001111000000001111 |

FIG. 6A

| Codeword Index | Walsh Sequence |
|---|---|
| 29 | 0101101010100101101001010101011010 |
| 30 | 0011110011000011110000110011100 |
| 31 | 0110100110010110100101100101001 |

FIG. 6B

| Modulation | Code Rate | Spread Factor | FECFRAME | PLH length – not including guard band (chips) | PLH length – not including guard band (MCP units) | Guard band (MCP units) |
|---|---|---|---|---|---|---|
| 16APSK | 9/10 | unspread | 64800 | 64 | 2 | 10 |
| 16APSK | 8/9 | unspread | 16200 | 64 | 2 | 1 |
| 16APSK | 5/6 | unspread | 64800 | 64 | 2 | 10 |
| 16APSK | 5/6 | unspread | 16200 | 64 | 2 | 1 |
| 16APSK | 4/5 | unspread | 64800 | 64 | 2 | 10 |
| 16APSK | 4/5 | unspread | 16200 | 64 | 2 | 1 |
| 16APSK | 3/4 | unspread | 64800 | 64 | 2 | 10 |
| 16APSK | 3/4 | unspread | 16200 | 64 | 2 | 1 |
| 16APSK | 2/3 | unspread | 64800 | 64 | 2 | 10 |
| 16APSK | 2/3 | unspread | 16200 | 64 | 2 | 1 |
| 8PSK | 2/3 | unspread | 64800 | 64 | 2 | 14 |
| 8PSK | 2/3 | unspread | 16200 | 64 | 2 | 2 |
| 8PSK | 3/5 | unspread | 64800 | 64 | 2 | 14 |
| 8PSK | 3/5 | unspread | 16200 | 64 | 2 | 2 |
| QPSK | 3/5 | unspread | 64800 | 96 | 3 | 21 |
| QPSK | 3/5 | unspread | 16200 | 96 | 3 | 3 |
| QPSK | 1/2 | unspread | 64800 | 96 | 3 | 21 |
| QPSK | 1/2 | unspread | 16200 | 96 | 3 | 3 |
| QPSK | 2/5 | unspread | 64800 | 96 | 3 | 21 |
| QPSK | 2/5 | unspread | 16200 | 96 | 3 | 3 |
| QPSK | 1/3 | unspread | 64800 | 96 | 3 | 21 |
| QPSK | 1/3 | unspread | 16200 | 96 | 3 | 3 |
| QPSK | 1/4 | unspread | 64800 | 128 | 3 | 21 |
| QPSK | 1/4 | unspread | 16200 | 128 | 3 | 3 |
| QPSK | 2/5 | 2 | 16200 | 192 | 6 | 6 |
| pi/2-BPSK | 1/3 | unspread | 16200 | 192 | 6 | 6 |
| pi/2-BPSK | 1/3 | unspread | 24592 | 192 | 6 | 13 |
| QPSK | 1/3 | 3 | 16200 | 288 | 9 | 9 |
| QPSK-S | 1/3 | 2 | 16200 | 384 | 12 | 12 |
| QPSK-S | 1/3 | 2 | 24592 | 384 | 12 | 25 |
| QPSK-S | 1/3 | 3 | 16200 | 576 | 18 | 18 |
| QPSK-S | 1/3 | 3 | 24592 | 576 | 18 | 37 |

| Modulation | Code Rate | Spread Factor | FECFRAME | PLH length – not including guard band (chips) | PLH length – not including guard band (MCP units) | Guard band (MCP units) |
|---|---|---|---|---|---|---|
| QPSK-S | 1/3 | 4 | 16200 | 768 | 24 | 24 |
| QPSK-S | 1/3 | 4 | 24592 | 768 | 24 | 49 |
| QPSK-S | 1/3 | 5 | 16200 | 960 | 30 | 30 |
| QPSK-S | 1/3 | 5 | 24592 | 960 | 30 | 62 |
| QPSK-S | 1/3 | 7 | 16200 | 1344 | 42 | 42 |
| QPSK-S | 1/3 | 7 | 24592 | 1344 | 42 | 86 |
| QPSK-S | 1/3 | 9 | 16200 | 1728 | 54 | 54 |
| QPSK-S | 1/3 | 9 | 24592 | 1728 | 54 | 110 |
| QPSK-S | 1/3 | 11 | 16200 | 2112 | 66 | 66 |
| QPSK-S | 1/3 | 11 | 24592 | 2112 | 66 | 135 |
| QPSK-S | 1/3 | 14 | 16200 | 2688 | 84 | 84 |
| QPSK-S | 1/3 | 14 | 24592 | 2688 | 84 | 172 |
| QPSK-S | 1/3 | 18 | 16200 | 3456 | 108 | 108 |
| QPSK-S | 1/3 | 18 | 24592 | 3456 | 108 | 220 |
| QPSK-S | 1/3 | 23 | 16200 | 4416 | 138 | 138 |
| QPSK-S | 1/3 | 23 | 24592 | 4416 | 138 | 281 |

1000

| PN sequence length (correlator length) | Maximum positive sidelobe | PN sequence / flipping sequence |
|---|---|---|
| 2 | 0 | {-1,1} |
| 3 | 0 | {1,-1,-1} |
| 4 | 1 | {1,1,1,-1} |
| 6 | 1 | {1,1,-1,-1,-1,1} |
| 9 | 1 | {-1, 1, -1, 1, -1, -1, 1, 1, -1} |
| 12 | 1 | {-1,1,-1,-1,1,-1,1,1,1,-1,-1,-1} |
| 18 | 1 | {1,1,-1,-1,1,1,1,-1,1,1,-1,1,-1,-1,-1,-1,-1,1} |
| 24 | 1 | {-1,1,-1,-1,-1,1,-1,-1,1,-1,1,1,-1,1,1,1,1,-1,-1,-1,-1,1,1,1} |
| 30 | 3 | {-1,-1,-1,-1,1,1,1,1,1,1,-1,1,1,-1,1,1,-1,1,1,-1,-1,1,1,1,1,-1,-1,-1,1,-1} |
| 42 | 3 | {-1,1,1,-1,1,-1,-1,1,1,1,1,1,1,-1,-1,1,-1,-1,-1,1,1,1,-1,1,1,1,1,-1,1,-1,1,1,-1,-1,-1,1,1,-1,-1,-1,-1,-1,-1} |
| 54 | 7 | {-1,-1,-1,1,1,1,-1,1,1,1,1,1,1,-1,-1,1,1,1,-1,1,-1,-1,-1,-1,-1,-1,1,1,-1,1,1,1,-1,-1,-1,1,1,1,-1,1,1,-1,-1,1,-1,1,1,1,1,1,-1,1,1,-1,1,-1} |
| 66 | 9 | {-1,-1,1,1,-1,-1,1,1,1,1,-1,-1,1,-1,-1,1,-1,1,-1,-1,1,1,1,1,-1,-1,-1,-1,1,1,-1,1,1,1,-1,-1,1,-1,1,1,1,-1,-1,1,-1,-1,1,-1,-1,1,1,1,-1,-1,1,1,1,-1,-1,-1,-1,1,-1,-1,-1,1,1,1,1,-1} |
| 84 | 11 | {-1,1,1,1,1,1,1,1,-1,1,-1,-1,-1,1,-1,1,-1,1,1,1,1,1,-1,-1,1,1,1,-1,-1,-1,-1,1,-1,-1,-1,1,1,1,-1,-1,-1,1,1,1,-1,1,1,1,-1,1,-1,1,1,1,-1,-1,1,1,1,-1,-1,1,1,1,-1,-1,1,1,-1,1,1,-1,-1,1,-1,-1,1,-1,-1,1,1,1,1,-1,1,1,1,1,1,1,-1,1} |
| 108 | 17 | {1,-1,-1,-1,1,1,1,1,-1,1,1,-1,-1,-1,-1,1,-1,1,-1,-1,-1,1,-1,1,-1,1,1,1,1,1,1,-1,-1,-1,1,-1,1,1,-1,1,-1,1,1,1,1,-1,-1,1,1,1,-1,1,1,-1,1,1,-1,-1,-1,1,1,-1,1,-1,-1,1,-1,1,-1,-1,-1,-1,1,1,-1,-1,1,-1,-1,-1,1,1,1,1,1,1,-1,1,1,-1,-1,1,-1,1,1,-1,-1,1,1,-1,1,-1,1,1,1,-1,1,1,-1,-1,-1,-1,1,-1,1,-1,-1,-1,1} |
| 138 | 19 | {-1,1,1,1,-1,1,1,-1,-1,1,-1,1,1,-1,-1,1,-1,-1,-1,-1,-1,1,1,1,1,-1,-1,-1,1,1,1,-1,1,1,1,1,1,-1,1,1,1,1,-1,-1,1,1,1,1,1,1,1,-1,1,1,-1,-1,-1,-1,-1,-1,-1,-1,1,1,-1,1,1,1,1,1,-1,1,1,1,-1,-1,1,1,-1,-1,1,1,-1,-1,1,1,-1,1,-1,-1,-1,1,-1,1,-1,-1,-1,-1,1,-1,1,-1,-1,-1,-1,1,1,1,-1,-1,1,1,-1,1,-1,-1,1,-1,-1,1,-1,-1,1,-1,-1,1,1,1,-1,1,-1,1,1,1,1,1,1,1,1,-1,1,-1,-1,1,1,1,-1,-1,1,1,-1,-1,1,1,1,1,1,1,1,-1,-1,1} |

FIG. 10

| All lengths in chips | 1% | | 5% | | 10% | |
|---|---|---|---|---|---|---|
| MCP length | 36 | | 36 | | 36 | |
| DSU length | 1350 | | 1350 | | 1350 | |
| $N_4$ MDUs/DSF | 120 | | 118 | | 117 | |
| DSF length | 166320 | | 163548 | | 162162 | |
| UW length | 182 | | 3366 | | 3264 | |
| UP length | 2 | | 10 | | 11 | |
| IDU length | 180 | | 177 | | 91 | |
| Pilot Period length (Subframe length) | 182 | | 187 | | 102 | |
| $N_1$ Pilot Periods/ISF | 924 | | 924 | | 1782 | |
| $N_2$ Pilot Periods/UWs | 1 | | 18 | | 32 | |
| ISF length | 168350 | | 176154 | | 185028 | |
| $N_3$ per M Branches | $N_3$ | M | $N_3$ | M | $N_3$ | M |
| Convolutional | 9240 | 18 | 9086 | 18 | 9009 | 18 |
| Interleaver | 4752 | 35 | 4543 | 36 | 4914 | 33 |
| (examples for 0.1 up | 3080 | 54 | 3717 | 44 | 3003 | 54 |
| to 0.5 sec end-to-end | 2376 | 70 | 2478 | 66 | 2457 | 66 |
| delay in increments of | 1980 | 84 | 1947 | 84 | 2002 | 81 |
| ~0.1sec for 28.8 Mcps) | | | | | | |

EFFICIENT CONTROL SIGNALING OVER SHARED COMMUNICATION CHANNELS WITH WIDE DYNAMIC RANGE

CROSS-REFERENCES TO RELATED APPLICATIONS

The present application is a continuation of U.S. application Ser. No. 12/621,203, filed on Nov. 18, 2009, entitled "Efficient Control Signaling Over Shared Communication Channels with Wide Dynamic Range," which is a non-provisional claiming priority benefit of U.S. provisional patent application Ser. No. 61/115,871, filed on Nov. 18, 2008 and entitled "Efficient Control Signaling Over Shared Communication Channels with Wide Dynamic Range," and of U.S. provisional patent application Ser. No. 61/116,090, filed Nov. 19, 2008 and entitled "Improved Mobile Satellite Communication," the entire disclosures of which are herein incorporated by reference.

BACKGROUND

The present invention relates to wireless communications in general and, in particular, to a satellite communications network.

In some communication systems, such as satellite communications systems, a base station or hub communicates on a shared forward channel to a number of user terminals. It is often advantageous to use a single, high rate signal on this forward channel instead of a number of low-rate channels to distribute information to all the users. In this manner, the information to the different users may be multiplexed in time.

If the users have different C/N (carrier to noise) characteristics, then the messages to some users may need to be at a lower rate than the rate at which other users can successfully receive. This has been handled in the art by keeping a constant symbol rate but varying the modulation and/or coding on a user by user basis based on the capabilities of the current user. The data messages are supplemented by physical layer headers that identify the modulation and coding. These headers are designed to be successfully demodulated by even the most disadvantaged user.

In order to extend the dynamic range of for a satellite communication, such as a DVB-S2 system to 30 dB, merely by way of example, expanding the header may be prohibitive. The length of the header may approach the length of the data block for advantaged users, yielding a highly inefficient system.

There is thus a need for efficient control signaling systems, methods, and apparatuses that apply to shared communication channels with wide dynamic range.

Furthermore, in some satellite communications systems, user terminals are mobile on platforms such as airplanes, trains, automobiles, etc. This mobility creates a number of problems for the system designer, such as wide dynamic range of signal quality, signal fading, blockages, etc.

There is thus a need for methods, systems, and apparatus that provide wide dynamic range solutions to mitigate the effects of blockage and fading of a mobile satellite channel.

BRIEF SUMMARY

Embodiments provide methods, apparatuses, and systems for efficient control signaling that apply to shared communication channels with wide dynamic range.

Some embodiments may include a system for efficient control signaling over shared communication channels. The system may include a gateway configured to encode and to transmit multiple physical layer headers. Multiple physical layer headers may include a first physical layer header and a second physical layer header. The first physical layer header may span a first length and include information representing a first modcode; the second physical layer header may span a second length and include information representing a second modcode. The second length may be longer than the first length. In some embodiments, the first and second length may be chip lengths or symbol lengths. The system may also include multiple terminals in wireless communication with the gateway via satellite. The multiple terminals may include a first terminal configured to decode the first physical layer header and to determine the first modcode. The system may include a second terminal configured to decode the second physical layer header and determine the second modcode.

In some embodiments, a system for efficient control signaling over shared communication channels may include a first physical layer header that is of insufficient length for the second terminal to decode the first physical layer and for the second receiver to determine the first modcode associated with the first physical layer header. In some embodiments, a system for efficient control signaling over shared communication channels may have each physical layer header include multiple modcode partitions. Each modcode partition may be associated with a respective modcode point associated with the respective physical layer header.

In some embodiments, a system for efficient control signaling over shared communication channels may include having each modcode partition be represented by at least a portion of a Walsh code. In some embodiments, a system for efficient control signaling over shared communication channels may include modcode partitions that have the same length. In some embodiments, a spreading factor may be applied to modcode partitions.

In some embodiments, a system for efficient control signaling over shared communication channels may include modcode partitions of a respective physical layer header that are distributed within a data frame associated with the physical layer header. The modcode partitions may be distributed within the data frame at known locations. The modcode partitions may be distributed within the data frame such that the data frame is segmented into equal portions.

Some embodiments of a system for efficient control signaling over shared communication channels may include modcode partitions that are encoded according to a Reed-Muller code. Some embodiments may include modcode partitions that are encoded using an orthogonal variable spread factor. Some embodiments may include modcode partitions that are encoded according to an orthogonal code channel scheme. In some embodiments, a spreading factor may be applied to modcode partitions.

Embodiments may include another system for efficient control signaling over shared communication channels that includes a gateway configured to transmit multiple modcode signals. Each respective modcode signal may represent a respective modcode point from multiple modcode points. Each respective modcode point may represent modulation, coding, spreading, and/or frame size information. In some embodiments, a first modcode signal may represent a first modcode point and a second modcode signal may represent a second modcode. The system may include multiple terminals, in wireless communication with the gateway via satellite. The multiple terminals may include a first terminal configured to decode the first modcode signal and to determine the first modcode point. A second terminal may be configured to decode the second modcode signal and determine the second modcode point. The second terminal may be incapable of decoding the first modcode signal.

Some embodiments may include methods for efficient control signaling over shared satellite communication channels. Multiple modcode points may be determined. Each modcode point may represent at least a modulation, a code rate, a spreading factor, or a frame size. Multiple code words may be determined. Each respective code word may be associated with a respective modcode point from the multiple modcodes points. A first code word from the multiple code words may be modulated with a first pattern. The first pattern may depend upon a first signal to noise ratio associated with a first modcode point. A second code word from the multiple code words may be modulated with a second pattern. The second pattern may depend upon a second signal to noise ratio associated with a second modcode point. In some embodiments, the modulated second code word may be longer than the modulated first code word. The modulated first code block and modulated second code block may be transmitted over a wireless channel. In some embodiments, the modulated first code word may not be decodable by a terminal that can decode the modulated second code word.

In one embodiment, a method for efficient control signaling over shared communication channels is provided that may include determining multiple modcode points. Each modcode point may represent a modulation, a code rate, a spreading factor, and/or a frame size. Multiple modcode partitions may be determined. Each respective modcode partition may be associated with a respective modcode point from the multiple modcodes points. Multiple copies of a first modcode partition associated with a first modcode point may be transmitted over a wireless channel. The number of copies may be based on a first signal to noise ratio associated with the first modcode point. Multiple copies of a second modcode partitions associated with a second modcode point may be transmitted over the wireless channel. The number of copies of the second modcode partition may be based on a second signal to noise ratio associated with the second modcode point. The number of second modcode partitions transmitted may be greater than the number of first modcode partitions transmitted.

In some embodiments, a method for efficient control signaling over shared communication channels may include a number of first modcode partitions that may be of sufficient length for a first receiver to decode the first number of modcode partitions and to determine the first modcode associated with the first plurality of first modcode partitions while the first number of first modcode partitions is of insufficient length for a second receiver to decode the first number modcode partitions and to determine the first modcode associated with the first number of first modcode partitions.

In some embodiments, a method for efficient control signaling over shared communication channels may include modcode partitions that are represented by at least a portion of a Walsh code. In some embodiments, a method for efficient control signaling over shared communication channels may include modcode partitions that are distributed within a data frame. The modcode partitions may be distributed within the data frame at known locations. The modcode partitions may be distributed within the data frame such that the data frame is segmented into equal portions. In some embodiments, the modcode partitions may all have the same length.

Some embodiments may provide an adaptive coding, spreading, and modulating terminal to process a modcode signal from a received wireless signal. The terminal may include a receiver module configured to receive the wireless signal transmitted via a satellite. The terminal may include an A/D module, communicatively coupled with the receiver module. The A/D module may be configured to process the received wireless signal to generate a digitized stream of symbols comprising a modcode signal. The terminal may include a modcode detector module, communicatively coupled with the A/D module. The modcode detector module may be configured to determine a portion of the digitized stream of symbols comprising the modcode signal. The modcode detector module may be configured provide the modcode signal to one or more correlators, wherein the one or more correlators each has a respective length. The modcode detector module may be configured examine one or more outputs from the one or more correlators. At least one of the respective lengths of one or more correlators may depend on a signal to noise ratio associated with the terminal. The modcode detector module may be configured to determine a specific modcode from the modcode signal based on the one or more outputs from the one or more correlators.

In some embodiments, an adaptive coding, spreading, and modulating terminal may include a demodulator module, communicatively coupled with a modcode detector module. The demodulator module may be configured to receive information regarding the specific modcode from the modcode detector. The demodulator module may be configured to demodulate a data portion of the received wireless signal based on the information regarding the specific modcode.

In some embodiments, an adaptive coding, spreading, and modulating terminal may include a decoder module, communicatively coupled with a modcode detector module. The decoder module may be configured to receive information regarding the specific modcode from the modcode detector. The decoder module may be configured to decode a data portion of the received wireless signal based on the information regarding the specific modcode.

In some embodiments, an adaptive coding, spreading, and modulating terminal may further include a despreader module, communicatively coupled with the modcode detector module. The depsreader module may be configured to receive information regarding the specific modcode from the modcode detector. The despreader module may be configured to despreading the data portion of the received wireless signal based on the information regarding the specific modcode.

In some embodiments, an adaptive coding, spreading, and modulating terminal may further include a channel deinterleaver. The channel deinterleaver may deinterleave the digitized stream of symbols comprising the modcode signal.

Some embodiments provide methods, systems, and apparatuses that may include a common unit length of channel symbols interspersed with a distributed physical layer header (PLH). The PLH when decoded may describe the modulation, spread factor, code rate, and FECFRAME (forward error correcting frame) size. A number of signaling techniques are possible, examples of which include, but are not limited to, repetition coding, Orthogonal Variable Spread Factor (OVSF) coding and Orthogonal Code Channels (OCC).$_{[T\&T\&C}1]$

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 2 illustrates an example of data stream unit table according to various embodiments.

FIGS. 3A and 3B are block diagrams illustrating different examples of modcode partitions, data stream units, and physical layer headers according to various embodiments.

FIG. 4 illustrates an example of a data stream unit table according to various embodiments.

FIGS. 5A and 5B illustrates an example of a modcode table according to various embodiments.

FIGS. 6A and 6B illustrate an example of a Walsh sequence table according to various embodiments.

FIGS. 8A and 8B illustrates an example of a modcode signal table utilizing orthogonal code channels according to various embodiments.

FIG. 10 illustrates a PN sequence/flipping sequence table according to various embodiments.

DETAILED DESCRIPTION

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following may individually or collectively be components of a larger system, wherein other procedures may take precedence over or otherwise modify their application. Also, a number of steps may be required before, after, or concurrently with the following embodiments.

Figure 1:
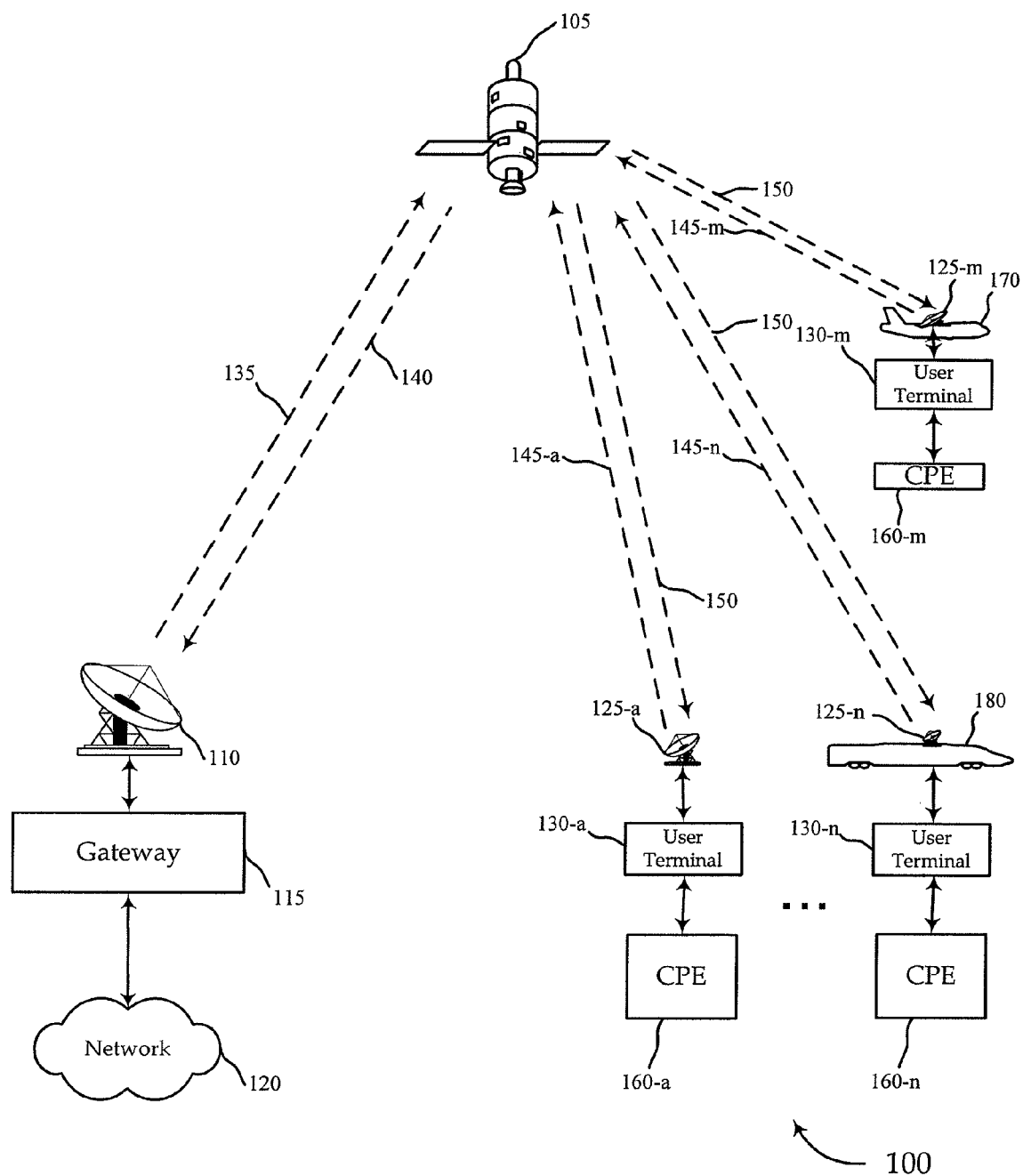
FIG. 1 is a block diagram of a satellite communications system configured according to various embodiments.

Referring first to FIG. 1, a block diagram illustrates an example satellite communications system 100 configured according to various embodiments of the invention. While a satellite communications system is used to illustrate various aspects of the invention, it is worth noting that certain principles set forth herein are applicable to a number of other wireless systems, as well (e.g., other peer-to-peer wired or wireless links). The satellite communications system 100 includes a network 120, such as the Internet, interfaced with a gateway 115 that is configured to communicate with one or more user terminals 130, via a satellite 105. The modcode signal processing and blockage mitigation techniques discussed herein may be used by a user terminal 130 to process signals received from a gateway 115 via satellite 105.

The network 120 may be any type of network and can include, for example, the Internet, an IP network, an intranet, a wide-area network (WAN), a local-area network (LAN), a virtual private network (VPN), the Public Switched Telephone Network (PSTN), or any other type of network supporting data communication between any devices described herein. A network 120 may include both wired and wireless connections, including optical links. Many other examples are possible and apparent to those skilled in the art in light of this disclosure. The network may connect the gateway 115 with other gateways (not pictured), which are also in communication with the satellite 105, and which may share information on link conditions and other network metrics.

The gateway 115 provides an interface between the network 120 and the user terminal 130. The gateway 115 may be configured to receive data and information directed to one or more user terminals 130, and format the data and information along with control signals (e.g., using Adaptive Coding Modulation (ACM) or Variable Coding and Modulation (VCM)) for delivery downstream to the respective user terminals 130 via the satellite 105. Multi-beams satellites may be used with VCM or ACM. According to the message type and the link condition, VCM and ACM transmitters may utilize codes of various rates and sizes and modulations of different orders. High rate codes and high order modulations are used to take advantage of favorable channel conditions, while low rate codes and low order modulations are used to ensure error free transmission when the channel conditions degrade, merely by way of example. As will be discussed below, formatting data, information, and control signals may also include spreading techniques resulting in Adaptive Coding, Spreading, and Modulation (ACSM). Similarly, the gateway 115 may be configured to receive upstream signals from the satellite 105 (e.g., from one or more user terminals 130) directed to a destination in the network 120, and can format the received signals for transmission through the network 120.

A device (not shown) connected to the network 120 may, therefore, communicate with one or more user terminals 130 through the gateway 115. Data and information, for example IP datagrams, may be sent from a device in the network 120 to the gateway 115. The gateway 115 may format a Medium Access Control (MAC) frame in accordance with a physical layer definition for transmission to the satellite 105 via a downstream link 135. A variety of physical layer transmission modulation and coding techniques may be used with certain embodiments of the invention, including those defined with the DVB-S2 and WiMAX standards. In a number of embodiments, the gateway 115 utilizes ACSM in conjunction with one or more of the traffic control and shaping techniques described herein to direct traffic to the individual terminals. The gateway 115 may use a broadcast signal, with a modulation and coding format adapted for each packet to the link conditions of the terminal 130 or set of terminals 130 to which the packet is directed (e.g., to account for the variable service link 150 conditions from the satellite 105 to each respective terminal 130).

The gateway 115 may use an antenna 110 to transmit the signal to the satellite 105. In one embodiment, the antenna 110 is a parabolic reflector with high directivity in the direction of the satellite and low directivity in other directions. The downstream signals 135, 150 may include, for example, one (or more) single carrier signals. Each single carrier signal may be divided in time (e.g., using TDMA or other time division multiplexing techniques) into a number of sub-channels. The sub-channels may be the same size, or different sizes, and a range of options will be addressed below. In some embodiments, other channelization schemes may be integrated with or used in place of time-divided sub-channels, such as Frequency Division Multiple Access (FDMA), Orthogonal Frequency Division Multiple Access (OFDMA), Code Division Multiple Access (CDMA), or any number of hybrid or other schemes known in the art.

In one embodiment, a geostationary satellite 105 is configured to receive the signals from the location of antenna 110 and within the frequency band and specific polarization transmitted. The satellite 105 may, for example, use a reflector antenna, lens antenna, array antenna, active antenna, or other mechanism known in the art for reception and/or transmission of signals. The satellite 105 may process the signals received from the gateway 115 and transmit the signal from the gateway 115 to one or more user terminals 130. In one embodiment, the satellite 105 operates in a multi-beam mode, transmitting a number of narrow beams each directed at a different region of the earth, allowing for frequency re-use. With such a multi-beam satellite 105, there may be any number of different signal switching configurations on the satellite, allowing signals from a single gateway 115 to be switched between different spot beams. In one embodiment, the satellite 105 may be configured as a "bent pipe" satellite, wherein the satellite may frequency-convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments, a number of configurations are possible (e.g., using LEO satellites, or using a mesh network instead of a star network), as evident to those skilled in the art.

The service signals transmitted from the satellite 105 may be received by one or more user terminals 130, via the respective user antenna 125. In one embodiment, the antenna 125 and terminal 130 together make up a very small aperture terminal (VSAT). In other embodiments, a variety of other types of antennas 125 may be used at the user terminal 130 to receive the signal from the satellite 105. Each of the user terminals 130 may be a single user terminal or, alternatively, be a hub or router (not pictured) that is coupled with multiple user terminals. Each user terminal 130 may be connected to consumer premises equipment (CPE) 160 (e.g., computers, local area networks, Internet appliances, wireless networks, etc.). In some embodiments, antenna 125 and user terminal 130 may coupled with a mobile platform. FIG. 1 shows, merely by way of example, antenna 125-m and user terminal 130-m coupled with airplane 170; antenna 125-n and terminal 130-n are coupled with train 180.

In one embodiment, a Multi-Frequency Time-Division Multiple Access (MF-TDMA) scheme is used for upstream links 140, 145, allowing efficient streaming of traffic while maintaining flexibility in allocating capacity among each of the user terminals 130. In this embodiment, a number of frequency channels are allocated which may be fixed, or which may be allocated in a more dynamic fashion. A Time-Division Multiple-Access (TDMA) scheme is then employed in each frequency channel. In this scheme, each frequency channel may be divided into several timeslots that can be assigned to a connection (i.e., a user terminal 130). In other embodiments, one or more of the upstream links 140, 145 may be configured with other schemes, such as TDMA, FDMA, OFDMA, CDMA, or any number of hybrid or other schemes known in the art.

A user terminal 130 may transmit information related to signal quality to the gateway 115 via the satellite 105. The signal quality may be a measured signal-to-noise ratio, an estimated signal-to-noise ratio, a bit error rate, a received power level, or any other communication link quality indicator. The user terminal 130 itself may measure or estimate the signal quality, or it may pass information measured or estimated by other devices. A user terminal 130 may also transmit data and information to a network 120 destination via the satellite 105 and gateway 115. The user terminal 130 transmits the signals via the upstream uplink 145 to the satellite 105 using the antenna 125. A user terminal 130 may transmit the signals according to a variety of physical layer transmission modulation and coding techniques, including those defined with the DVB-S2 and WiMAX standards. In various embodiments, the physical layer techniques may be the same for each of the links 135, 140, 145, 150, or may be different. The gateway 115 may, in some embodiments, use this signal quality information to implement ACSM, adjusting the modulation, spreading, and coding formats to each terminal or set of terminals based on their link conditions.

Embodiments provide methods, systems, and apparatuses for ACSM. Embodiments may utilize available transponder bandwidth across a variety of mobile users. Each terminal in conjunction with the gateway may adapt its forward channel modulation, coding, and spread factors based upon the terminal's $E_c/N_o$, merely by way of example. $E_c/N_o$ and $E_s/N_o$ may be used interchangeably throughout this disclosure; $E_c/N_o$ and $E_s/N_o$ may be the same when there is no spreading; $E_c/N_o$ and $E_s/N_o$ may differ by $10*\log_{10}$ (spread factor) when there is spreading. A mobile user may be limited in $E_c/N_o$ due to its location within the area of coverage and/or the terminal's antenna size.

Merely by way of example, the range in effective isotropic radiated power (EIRP) covered over a few representative regions may be 38 dBW up to 54 dBW. Mobile users on a single network can include, but are not limited to, aircraft, trains, or boats and may roam over any part of the coverage area. A modem may be mated to a variety of antennas. The antenna size of any terminal may vary from 0.23 m up to 0.91 m (9 inches up to 36 inches), merely by way of example. Other terminals may be associated antennas with other sizes in some embodiments. Combining the EIRP range and antenna size, the terminal's receiver may see $E_c/N_o$'s from −17 dB up to +13 dB, merely by way of example. Some embodiments may have different $E_c/N_o$ ranges.

A modcode signal may be utilized to dynamically signal information including, but not limited to, a modulation type, a spread factor, a code rate, and/or a frame size/type of coding. A specific modcode may be referred to as a modcode point, which may merely reflect that the modcode is one modcode amongst a list of modecodes (or modcode points) for a terminal and/or a system. A specific modcode may represent a specific set of information that may include a modulation scheme, a spread factor, a code rate and/or type of coding, and/or a frame length. The frame size may be a FECFRAME size in some embodiments. The code rate may be for a low density parity check (LPDC) decoder and/or a turbo decoder in some embodiments. By dynamically signalling this modcode information, terminals may tradeoff $E_c/N_o$ for datarate. Merely by way of example, the following provides different modcode signaling modulation types, spread factors, code rates, and frame sizes. These are merely to provide examples of these possible parameters, while some embodiments may include other parameters. Modulation types may include, but are not limited to, QPSK-S, pi/2 BPSK, QPSK for unspread mode and limited spread modes, 8PSK for unspread mode, and 16APSK for unspread mode. Spread factors may include, but are not limited to, unspread (spread factor 1) or 2 up to 23. Code rates may include, but are not limited to, turbo code parallel concatenated convolutional codes (PCCC)-rate ⅓, LDPC code rates for QPSK-¼, ⅓, ⅖, ½, ⅗, ⅔, ¾, ⅘, ⅚, ⅞, ⁹⁄₁₀ (normal FECFRAME), LDPC code rates for 8PSK-⅗, ⅔, ¾, ⅘, ⅚, ⅞, ⁹⁄₁₀ (normal FECFRAME), LDPC code rates for 16APSK-⅔, ¾, ⅘, ⅚, ⅞, ⁹⁄₁₀ (normal FECFRAME). Frames sizes may include, but are not limited to, FECFRAME size of 24592 symbols, FECFRAME size of 16200 (short) symbols, FECFRAME size or 64800 (normal) symbols.

Embodiments of modcode signaling may allow for minimal overhead for modcode signaling. Furthermore, embodiments may provide for modcode signaling that only has to be decoded for the destined terminal; all modcode signals do not have to be decoded by every terminal. In addition, embodiments may provide a modcode table capable of being changed in the future so that there may be room for growth or easy modification of the table. Modcode signaling may provide various modulation types, code rates, and spread factors that may be time-division multiplexed on a single carrier at varying information bit rates with a constant symbol rate or chip rate in some embodiments. In some embodiments, an appropriate level of coding, spreading, and/or modulating may be applied for each user terminal based on the terminals known channel conditions.

Embodiments provide methods, apparatuses, and systems for variable or adaptive encoding of modcode point signaling information. In some embodiments, a modcode point signal is provided enough energy such that a terminal that may be able to decode a frame at a respective modcode point would be able to receive and decode the modcode point signal information. Other terminals may not be able to decode the modcode point signal and they may not need to decode the modcode point signal.

In some embodiments, a physical layer header (PLH) may be utilized to convey information regarding a modcode point, including, but not limited to, modulation, spread factor, code rate, and/or frame size information for a data frame. The data frame may be a forward error correction frame (FECFRAME) in some embodiments. The length of a PLH for a specific modcode point may depend upon the modcode point in some embodiments.

A physical layer header may be a distributed PLH in some embodiments. A distributed PLH may be represented as multiple copies of a modcode partition (MCP) in some embodiments. MCPs for an entire FECFRAME may form a PLH. A PLH when decoded may describe the modulation, spread factor, code rate, and FECFRAME size along with other information.

In some embodiments, a modcode partition may be representative of a specific modcode point. Each MCP may be of a uniform length in some embodiments. For a specific frame with an associated modcode, copies of a specific MCP also associated with the modcode point may be inserted into a data frame at different locations of the data frame. The insertion locations may be known by a receiver. In some embodiments, MCPs are prepended or appended to portions of a data frame such that the data frame is divided into known lengths. In some embodiments, a data frame such as a FECFRAME may be divided into a common unit length. Merely by way of example, such a common unit length of a data frame may be referred to herein as a data stream unit (DSU). Merely by way of example, FIG. 2 provides table 200 where a data stream unit (DSU) has been chosen to have a length of 1350 chips. This length may be chosen merely to divide evenly into one or more known frames sizes, such as some FECFRAME sizes. However, in other embodiments, other DSU lengths may be utilized within the scope and spirit of the disclosure.

Merely by way of example, FIGS. 3A and 3B provide embodiments showing examples of MCP, DSU, and PLH for two short FECFRAMES. FIG. 3A shows a 16APSK short FECFRAME, with no spreading. The PLH includes of MCPa, MCPb, and MCPc. The encoded FECFRAME includes DSU 0, DSU 1, and DSU 2. FIG. 3B shows 8PSK short FECFRAME with no spreading. The PLH includes MCPa, MCPb, MCPc, and MCPd. The encoded FECFRAME includes DSU 0, DSU 1, DSU 2, and DSU 3. In these examples, the MCPs are prepended to each DSU.

In some embodiments, spreading may also be performed on the MCPs and/or DSUs. In spread cases, partitioning of a data frame such as a FECFRAME into DSUs may be performed after spreading. As a result, a partitioned data frame may consist of chips.

The previous examples may reflect embodiment where a common unit length of channel symbols may be chosen to evenly divide into a symbol length for a data frame such as a short and/or normal FECFRAME. However, this is not required. For example, consider a FECRAME that is a multiple of 24592 chips in length, which may depend on a spread factor. Using a DSU of 1350 chips, FIG. 4 provides table 400 reflecting examples showing the number of DSUs per FECFRAME with different spread factors. It also summarizes the overhead due to the extra chips from an unfilled DSU.

The choice of a common unit length of 1350 symbols (chips) should not be seen as limiting. Other common unit lengths may be utilized in different embodiments. Furthermore, a common unit length may not be necessary in some embodiments. Utilizing a known segmentation of a data frame may also be utilized in some embodiments.

A modcode may represent a modulation scheme, a spread factor, a code rate and/or type of coding, and/or a frame length. Embodiments provide modcodes that may cover a wide dynamic range in C/N values. Merely by way of example, some embodiments may cover an approximately 30 dB of range. This range may include variation accounting for a terminal's location within the satellite footprint and a terminal's antenna size. FIGS. 5A and 5B provide table 500 that represents one set of modcodes, in accordance with various embodiments. As noted above, a modcode may be referred to as a modcode point in some cases.

A modcode table, such as that found in FIGS. 5A and 5B, may not cover every possible combination of frame size, modulation, code rate, and/or spread factor. A modcode table may be limited; for example, table 500 of FIGS. 5A and 5B were limited to a size of 63 in order to keep the MCP small. Larger tables may require larger MCPs and overhead may increase. In some embodiments, a modcode table can be expanded as needed. Furthermore, even with a limited on the number of modcodes in a table, the limit does not necessarily have to be reached. For example, in some cases, modcodes that may not provide much difference from other modcodes may be not be included in some cases; a modcode table may cover pertinent modulations, code rates, and spread factors. For example, table 500 in FIGS. 5A and 5B only includes 48 modcodes.

Merely by way of example, in FIGS. 5A and 5B, table 500 includes a calculated operating point or $E_s/N_o$ that was taken at a highest operating chip rate (or symbol rate), 45 Mcps. The operating points at a given modulation and code rate were those which may require a $E_b/N_o$ at the quasi-error-free (QEF) point, occurring at the short FECFRAME size, as provided in table 500. For any pair of modcodes with short and normal FECFRAMES, only the higher $E_s/N_o$ is listed in the table. Some embodiments may utilize different operating points.

Modcode signaling, according to various embodiments, may be done in a variety of ways. The following provides several examples, though other methods, apparatuses, and systems may be utilized within the scope and spirit of the disclosure.

In some embodiments, modcode signaling may utilize codewords or a combination of the codewords that are "modulated" with a BPSK pattern to provide modcode information. The length of the BPSK pattern may depend upon the desired $E_s/N_o$ of the modcode point to be received.

Some embodiments may utilize Walsh sequences. Walsh sequences are $2^N$ in length, where N is an integer. They are binary sequences and each sequence is orthogonal to all the other ones of the same length. FIGS. 6A and 6B provide table 600 that shows Walsh sequences of length 32. Other Walsh sequence lengths may be utilized in some embodiments. Walsh sequences may be utilized in several examples provided below.

In some embodiments, a repetition coding may be utilized for modcode signaling. Repetition coding may utilize a Reed-Muller code for example. Reed-Muller codes are based upon Walsh sequences. Each first order Reed-Muller code is based upon the Walsh sequences of length $2^N$ and the inverted version of each. A Reed-Muller code RM (32, 6), for example, is based upon the length 32 Walsh sequence and the inversion of each sequence. This gives 6 information bits since there are 64 codes. Walsh sequences may be decoded efficiently using a fast Hadamard Transform (FHT) in some embodiments.

Merely by way of example, a Reed-Muller code, RM (32, 6), may be utilized for some repetition coding used for modcode signaling. Other embodiments may use Reed-Muller codes of different lengths, such as RM (64, 7) and RM (128, 8), merely by way of example. A Reed-Muller code may be used to indicate which modulation, coding, and/or spreading are used. For RM (32, 6), a modcode table may be limited to a size of 64.

A RM (32, 6) code may be broken up such that it spans two MCPs where each MCP may be at least 16 chips in some embodiments. A scrambling sequence may be applied. This may account for situations where a first half and a second half of some codewords may be the same. In some embodiments, a BPSK pattern, which may be PN sequence/flipping pattern, may be imposed on the codewords that were "repeated". Any extra gaps left due to number of MCPs per FECFRAME may be filled with a guard band.

Figure 7A:
FIGS. 7A and 7B illustrates an example of a modcode signal table utilizing repetition coding according to various embodiments.
Figure 7B:

Merely by way of example, modulation 16APSK may be represented as 3 MCPs. Two of the MCPs may be used to form the modcode. The third MCP may be a guard band. The guard band may be one of the Reed-Muller codes left in reserve. FIGS. 7A and 7B provide table 700 that shows the guard bands and "repetitions" per modcode according to various embodiments.

In some embodiments, an orthogonal variable spread factor (OVSF) may be utilized for modcode signaling. Merely by way of example, an OVSF may utilize the 32 Walsh sequences shown in table 600 of FIGS. 6A and 6B on the I and Q channels. Some embodiment may utilize other Walsh sequence lengths. The MCP length may have a minimum of 32 chips for OVSF when utilizing a 32 Walsh sequence.

A unique set of Walsh sequences on the I channel may be used for each modulation group in some embodiments utilizing OVSF. Merely by way of example, three of the Walsh sequences may be used to indicate the 16APSK code rates and FECFRAME sizes. This may limit the number of 16APSK combinations to 8. A modcode receiver may need to receive the three Walsh sequences in the same order as they were transmitted in order for it to declare the winner belonging to the 16APSK group. The sign of a peak from an FHT may indicate the Walsh sequence used in some embodiments. The sign of the FHT may indicate the overlay sequence/flipping pattern used in some embodiments. Grouping the three outputs from the FHTs for each Walsh sequence may serve as the index into a table indicating the code rate and FECFRAME size.

Another unique set of four Walsh sequences on the I channel may be used to indicate the 8PSK code rates and FECFRAME sizes, merely by way of example. These four sequences may be different from the ones used in the 16APSK case. Another unique set of six Walsh sequences on the I channel may be used to indicate QPSK code rates and FECFRAME sizes, merely by way of example. These six sequences may also be different from the ones used in 16APSK and 8PSK cases.

The remaining Walsh sequences on the I channel and all the Walsh sequences on the Q channel may be used to indicate the remaining modcodes, legacy FECFRAMEs, replacement LDPC FECFRAMEs, and/or the gap fillers with QPSK and small spread factors for example.

In some embodiments, orthogonal code channels (OCC) may be utilized for modcode signling according to various embodiments. Merely by way of example, one embodiment utilizing OCC may use the 32 Walsh sequences on the I and Q channels. Other embodiments may utilize other Walsh sequence lengths.

Utilizing Walsh sequences of length 32 may limit the modcode table size to 63 where 32 modcode points are on the I channel and another 32 modcode points are on the Q channel in some embodiments. One of the 64 modcode points may be used as a guard band in some embodiments. For each modcode point, a single Walsh sequence may be used on the I (or Q) channel. In some embodiments, a PN sequence may be imposed on the Walsh sequence. Each bit of the PN sequence may either invert the whole sequence or leave it non-inverted. In some embodiments, the length of the PN sequence may depend upon the FECFRAME length in DSUs. Merely by way of example, the PN sequence length may be $$\left\lceil \frac{number\_of\_DSUs}{2} \right\rceil.$$

The remainder MCPs may be used as a guard band, a reserved Walsh sequence. This may prevent sequences from overlapping each other and may simplify the analysis.

Figure 8B:

Embodiments utilizing OCC with 32 Walsh sequences may have MCPs with a minimum of 32 chips, the length of the Walsh sequence. FIGS. 8A and 8B provide one possible modcode table 800 for OCC. The table summarizes the number of guard bands for short FECFRAMES for each PLH. Normal FECFRAMES may have much longer guard bands, but the same number of MCPs to form modcode part of the PLH. The purpose of the guard bands may be to flush a correlator. Also, the guard bands may help simplify the analysis of OCC.

Figure 9:
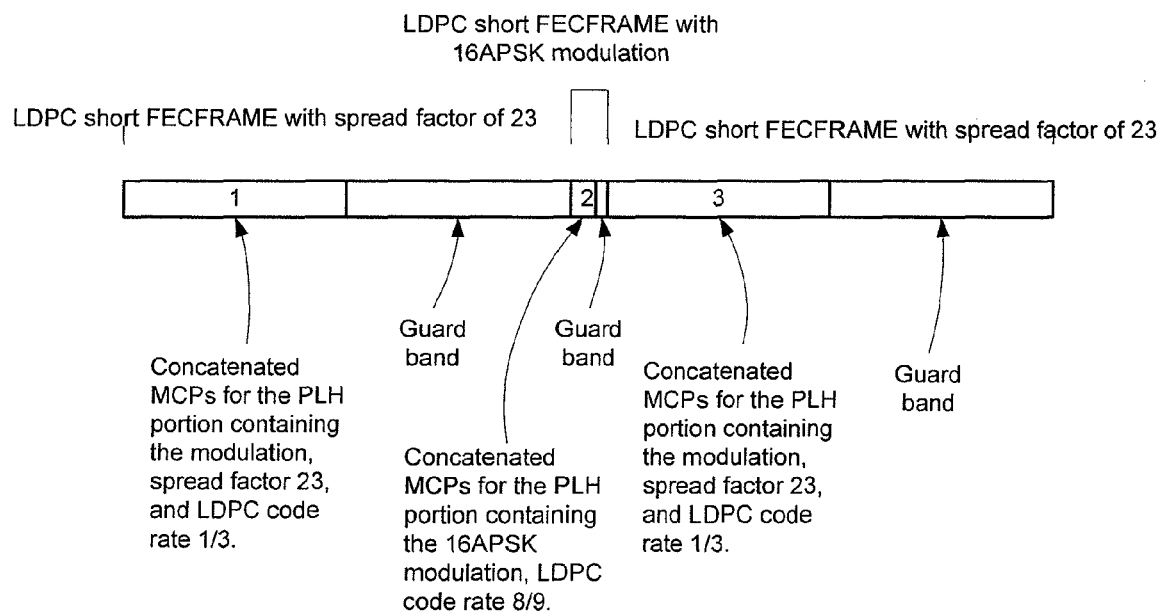
FIG. 9 is a block diagram of concatenated modcode partitions and guard bands for several modulations and spreading factors according to various embodiments.

Referring now to FIG. 9, this figure illustrates, merely by way of example, a 16APSK FECFRAME with LDPC code rate 8/9 between two LDPC FECFRAMEs with code rate 1/3 and spread factor 23, in accordance with various embodiments. The guard band for the spread frame is 138 MCPs in length and may be enough to flush its corresponding correlator, also of length 138 MCPs. This may simplify the analysis for block error rate (BLER) performance. It may also ease the search for PN sequences/flipping sequence of the MCPs. Because the correlator can be flushed, cross correlation or any partial overlap/correlation with another repeating FECFRAME of the same modcode may be avoided. Since the 16APSK FECFRAME only has 3 MCPs, two carry signaling information while the third is guard band. This is enough to flush its correlator.

FIG. 10 provides table 1000 that summarizes pseudonoise (PN) sequence/flipping sequence that may be used in some embodiments for the inverting and non-inverting pattern overlaid onto the MCPs to create the modcode portion of the PLH in some embodiments. Table 1000 also shows the distance between the peak of the correlator and the next largest sidelobe. The PN sequence was chosen to maximize the distance between the correlator peak and the next sidelobe. Other embodiments may use other PN sequences/flipping sequences.

Figure 11:
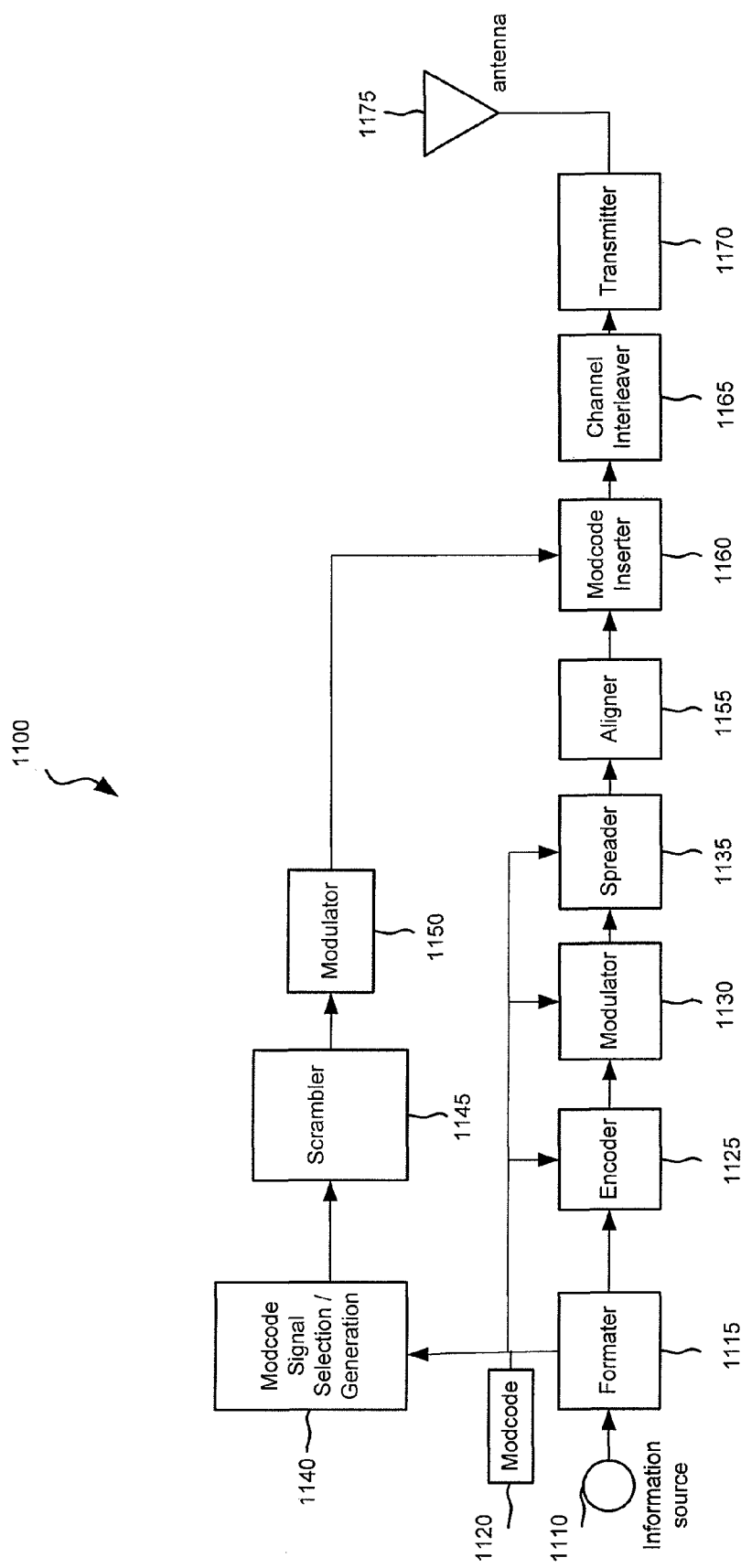
FIG. 11 is a block diagram of a transmitting device for a satellite communications system configured according to various embodiments.

FIG. 11 provides a block diagram of modulator 1100 that may be utilized for adaptive coding, spreading, and modulating according to various embodiments with variable and/or adaptive modcode signaling. Information source 1110 may provide information to modulator 1100. Formatter 1115 may format information from information source 1110; this may include converting an analog signal into digital signal. Formatter may also partition data into data frames. Modcode module 1120 may determine a modcode for a data frame of source information 1100 may be determined. In some embodiments, modcode module 1120 may vary or adapt modcodes on a frame by frame basis in some embodiments. Encoder 1125 may encode information received from formatter 1115. This may include, for example, encoding data from a data frame. It may include encoding symbols. Encoder 1125 may also encode information based on an encoder information associated with a modcode received from modcode module 1120. Modulator 1130 may receive encoded information from encoder module 1125 and modulate the information. Modulator 1130 may also modulate the information based on a modulation associated with a modcode received from modcode module 1120. Spreader 1135 may also spread data received from the other modules. Spreader 1135 may apply a spread factor based on a modcode received from modcode module 1120.

Modcode signal selection and generation module 1140 may then utilize information regarding a modcode determined by modcode module 1120. A modcode, for example, may be selected to be represented by a modcode representation for signaling purposes in different ways as discussed above. In some embodiments, the generated modcode representation or modcode signal may be overlaid with a sequence, such as a PN or flipping sequence. Generating a modcode representation or signal may also include guard band generation. Scrambler 1145 may scramble modcode representation. Scrambling may be used to remove the spectral impact of repeated Walsh sequence in some embodiments. In some embodiments, a data sequence may be scrambled. Modulator 1150 may then modulate the encoded and/or spread modcode representation. In some embodiments, the modulation may be a BPSK modulation, which may be a it/2-BPSK, though other modulation schemes may also be utilized.

In some embodiments, source information or data that has been formatted, encoded, modulated, and/or spread may be aligned or staggered with a modcode signal using aligner 1155. In some embodiments, the modcode signal may be represented as modcode partitions. The modcode signal may then be inserted into the data using modcode inserter 1160. In some embodiments, the data may be broken into blocks of a common unit length; this may be result in data stream units in some embodiments. In some embodiments, combined modcode signaling and data may then be interleaved using channel interleaver 1165. Transmitter 1170 may then transmit the combined information through antenna 1175. Some embodiments of an ACSM modulator may include more or less components. In some cases, the components may be combined. In some cases, the components may be split; for example, the aligner 1155 may be split between the 1155 and 1115 locations. In some embodiments, the modules may be used in different orders.

Figure 12:
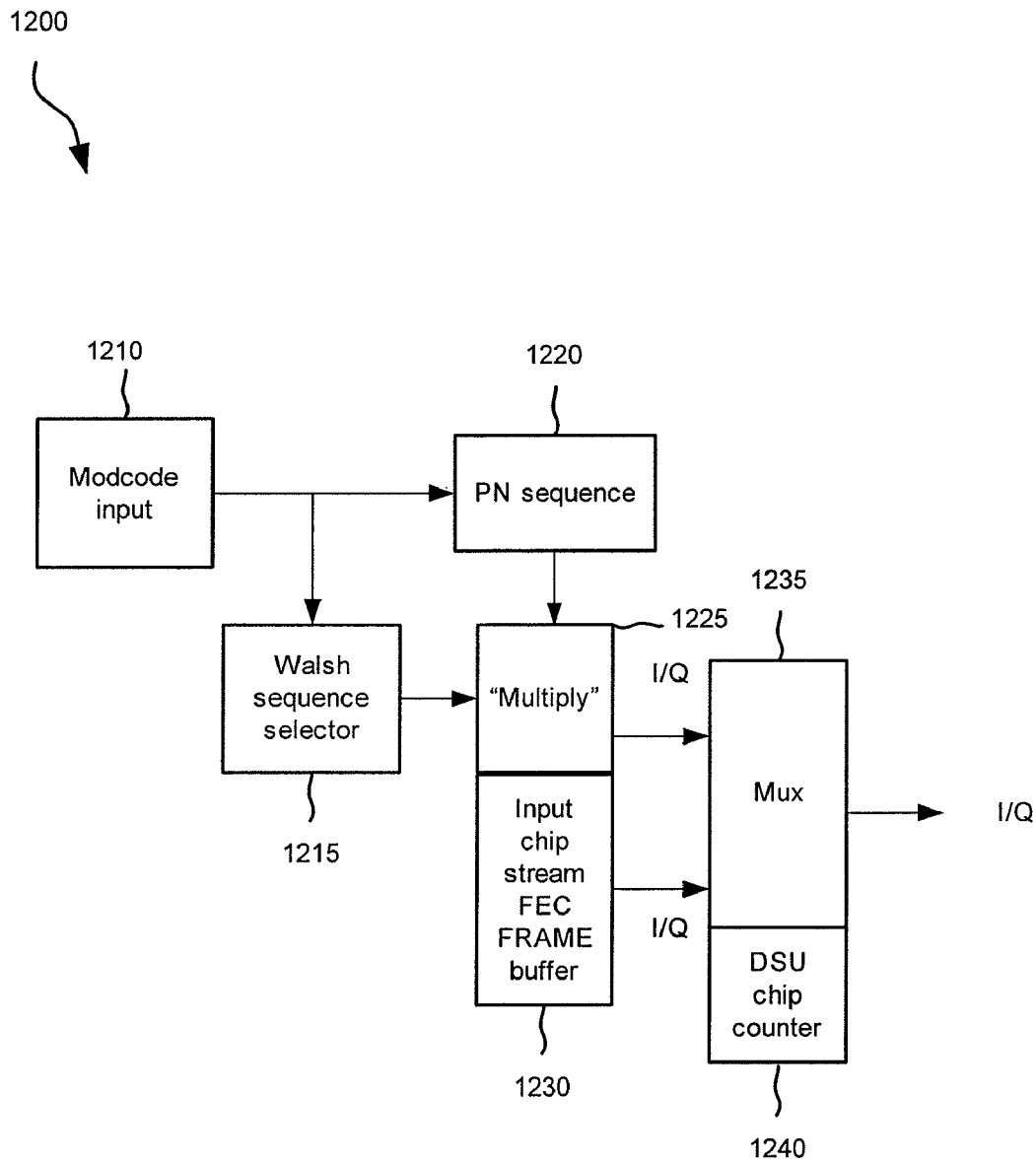
FIG. 12 is a block diagram reflecting aspects of a modulator according to various embodiments.

FIG. 12 provides another example of portion 1200 of an ACSM modulator that may be utilized for modcode insertion in accordance with various embodiments. Modcode input 1210 may be provided as discussed above. This may be based on a modcode associated with a data frame. In some embodiments, modcode input may come from a baseband framing that may accompany a FECFRAME. From modecode input 1210, a Walsh sequence may be selected by Walsh sequence selector 1215. A PN sequence may also be selected by PN sequence selector 1220. The Walsh sequence and PN sequence may then be combined, or "multipled" together at multiplier 1225. In some embodiments, input chip stream buffer 1230 may hold a FECFRAME while the FECFRAME is partitioned, such as into DSUs. Multiplexer 1235 may then insert MCPs into the partitioned FECFRAME. A modcode index may be embedded in the data prior to reaching the MCP inserting point since the data is already encoded, modulated and/or spread. Some embodiments may also include DSU chip counter 1240. Whenever DSU chip counter 1240 overflows, multiplexer 1235 may put input chip stream buffer 1230 on hold and insert the MCP in some embodiments. While DSU chip counter 1240 is incrementing, multiplexer 1235 may take data out of the input chip stream buffer 1230.

Figure 13:
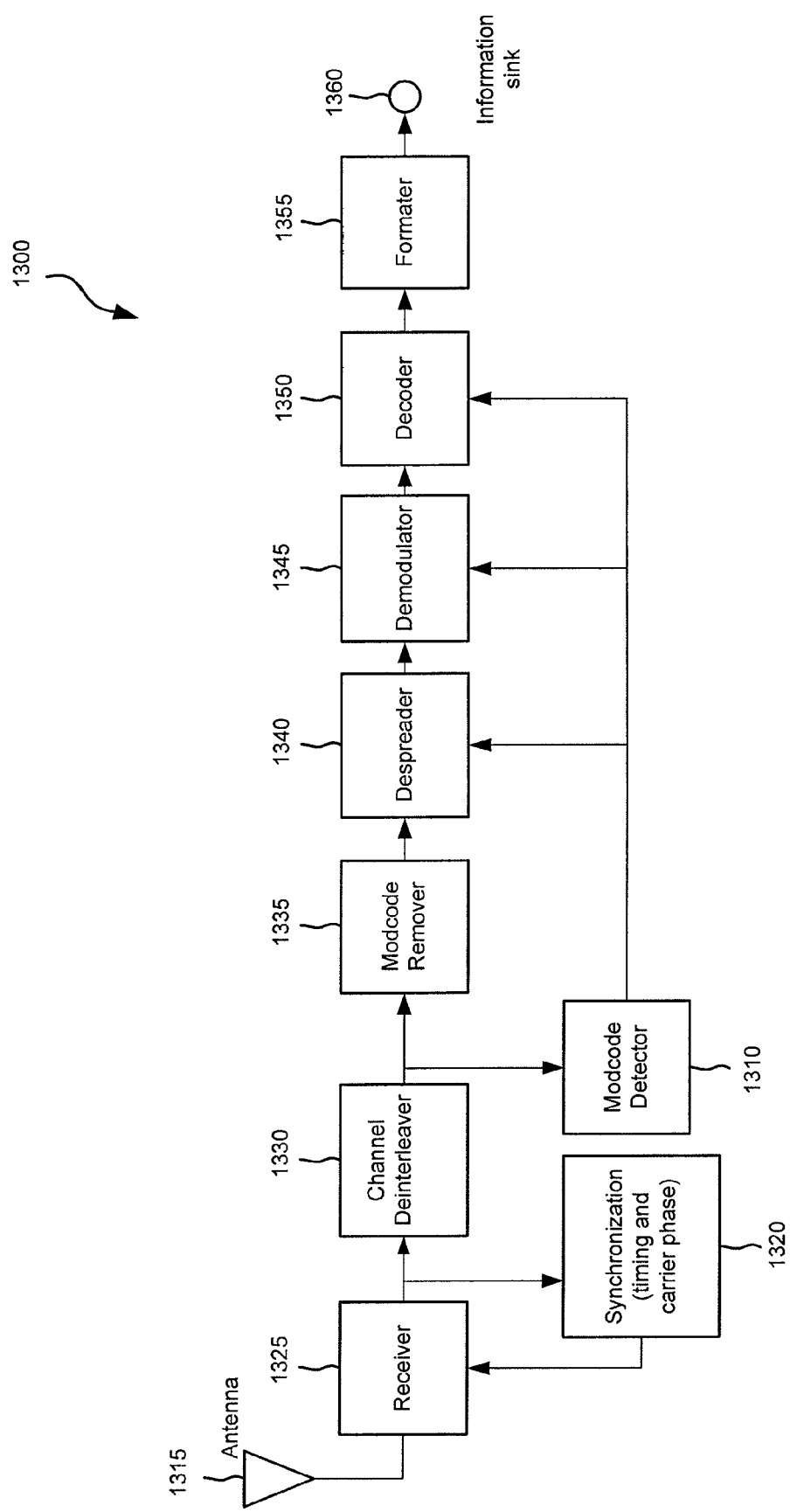
FIG. 13 is a block diagram of a receiving device for a satellite communications system according to various embodiments.

FIG. 13 provides a block diagram illustrating an example of receiver device 1300 configured according to various embodiments. In one embodiment, device 1300 is an adaptive coding, spreading, and modulating receiver that includes modcode detector 1310. In some embodiments, device 1300 may have time and carrier synchronization module 1320. Modcode detector 1310 may operate on data after time and carrier tracking loops, which may be part of synchronization module 1320; as a result, incoming chips may already be coherent in some embodiments. This may allow modcode representations such as MCPs to be summed coherently in some embodiments.

Device 1300 shows antenna 1315 and receiver module 1325 for receiving wireless signals. Synchronization module 1320 may also be coupled with receiver. Synchronization module 1320 may aid in providing timing and/or carrier phase information for the receiver. Embodiments with different synchronization modules are discussed below further.

Some embodiments may include channel deinterleaver 1330. Channel deinterleaver 1330 may include a convolutional deinterleaver as will be discussed in more detail below. A received signal, which may be deinterleaved, may have a modcode removed with modcode remover 1335. A received signal may also be despread using despreader 1340, demodulated with demodulator 1345, and/or decoded with decoder 1350. In addition, the received signal may be provided to modcode detector 1310. Modcode detector 1310 may decode the modcode information included with the received signal, in accordance with various embodiments. The decoded modcode information may provided to despreader 1340, to demodulator 1345, and/or to decoder 1350, such that these components may utilize this information to despread, demodulate, and/or decode the signal. Formatter 1355 may also format a resulting signal and provide it to information sink 1360. Some embodiments may utilize comparable modules in different orders and/or arrangements. Some embodiments may combine modules.

Figure 14:
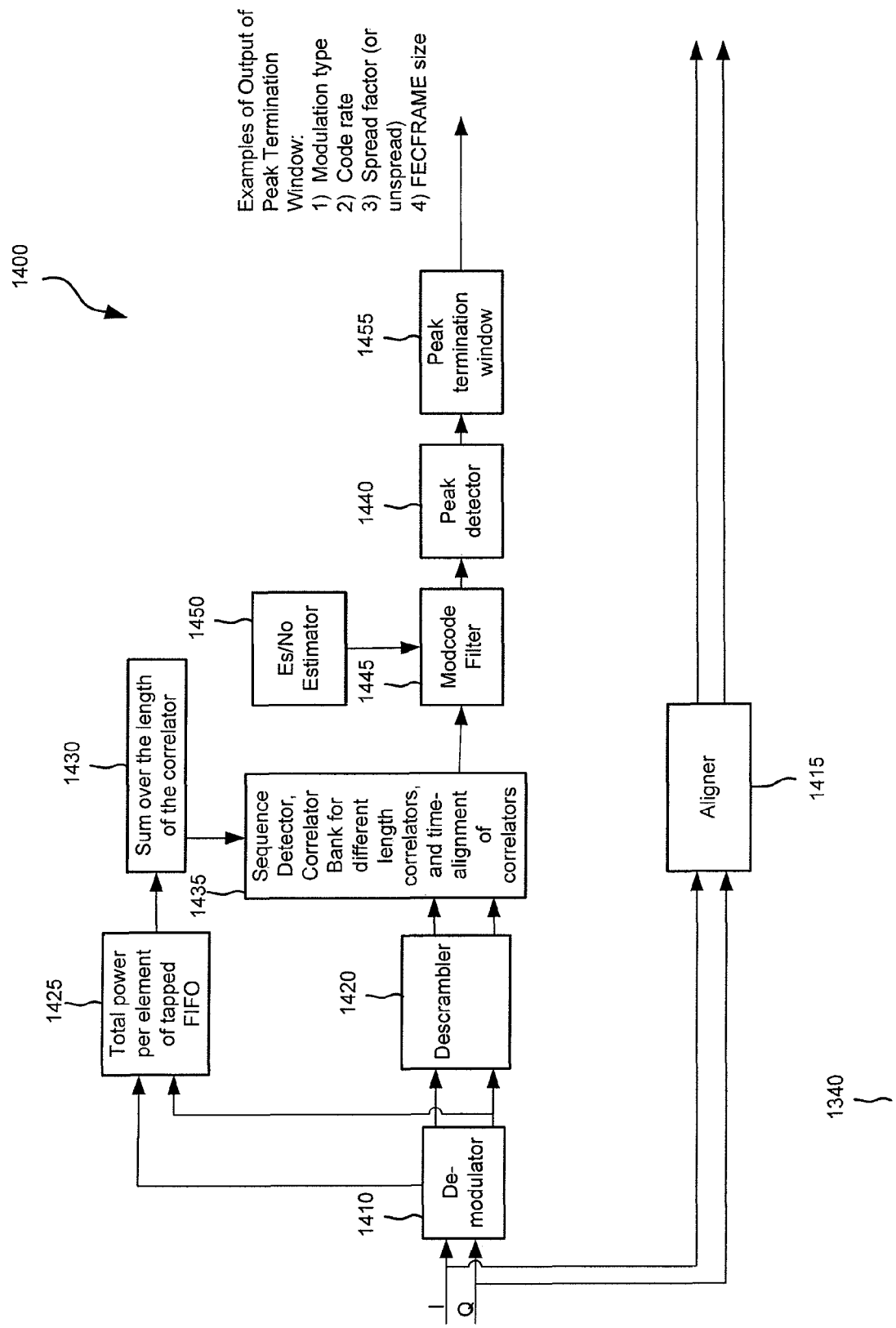
FIG. 14 is a block diagram of a modcode detector according to various embodiments.

FIG. 14 shows a block diagram illustrating modcode detector 1400 in accordance with various embodiments. Modcode detector 1400 may be modcode detector 1310 of device 1300 of FIG. 13, for example. Signals from both an in-phase and a quadrature channel (I/Q channels) may be fed into demodulator 1410. In some embodiments, signals from the I/Q channels may also be sent to aligner 1415, which may align data with a modcode detector output in some embodiments. Aligner 1415 may involve aligning data stream units (DSUs) with modcode partitions (MCP) in some embodiments. Alignment may also occur on a modulator end, such as with modulator 1100 and aligner 1155 of FIG. 11. From demodulator 1410, I/Q channel signals may be sent to descrambler 1420 synchronized to a frame structure such as a superframe (discussed in detail below) in some embodiments. Scrambling may remove a spectral impact of repeating modcode of all 0s or Z0Z0 pattern, in particular, when data is not interleaved for some embodiments.

In some embodiments, an aligner may also be used to present a FECFRAME to a decoder. In some embodiments, an aligner may receive descrambled, despread, demodulated, and/or deinterleaved data at its input.

In some embodiments utilizing modcode partitions, MCPs may typically be repeated with a PN sequence/flipping pattern of −1's and +1's imposed on each MCP. The MCPs as a result may have an impact to the spectrum. In embodiments utilizing an interleaver and deinterleaver, when the MCPs are interleaved, a minimum number of branches of the interleaver such as convolutional interleaver may exceed the MCP size if the end-to-end delay of the interleaver and deinterleaver is greater than some time value (0.2 seconds for example in some embodiments) so the MCP spectral impact is "dispersed" and no scrambling is required. For embodiments where interleaving is not used, scrambling may be needed. The same scrambling sequence may be applied over an entire frame structure, such as a super frame (discussed in more detail below), but may be only to the MCPs. The MCPs may have to be descrambled before any processing can begin; this may be done with descrambler 1420.

Demodulated modcode data from both I/Q channels may also be utilized at power calculation module 1425, which may determine a total power per element of a tapped FIFO or per MCP. A sum over the length of a correlator may also be determined at summing module 1430, providing total power over various correlator lengths to correlator bank 1435. Sequence detector and correlator bank 1435 may include a sequence detector for Walsh sequences, correlator bank for different correlator lengths corresponding to the overlay sequence/flipping pattern, and time-alignment of the various length correlators, in some embodiments. Module 1435 further may receive demodulated and possibly descrambled inputs from I/Q channels. Module 1435 may also normalize peak outputs of each correlator. Module 1435 may also be multiple modules in some embodiments.

In some embodiments, a tapped FIFO may help align all the different length correlators in time. The output of a correlator, if it is peaked, may be the start of the FECFRAME in some embodiments. Correlators may need to be aligned in time with the longest correlator to allow comparison of peaks via the peak detector module 1440 in some embodiments.

Some embodiments of modcode detector 1400 may include modcode filter 1445. For example, modcode filter 1445 may be implemented in embodiments utilizing orthogonal code channels. Modcode filter 1445 may allow the shorter length correlators to be ignored at the low $E_c/N_o$. This may be needed because the shorter length correlators may produce false alarms where the peaks output of the shorter correlators were sometimes larger than the real correct correlator peak output. In some embodiments, Es/No estimator 1450 may also provide Es/No information to modcode filter. An Es/No estimate may be fed back into the system so that coordination of a switch-over to a new modcode point. This may give a terminal a better data rate based on current conditions. Modcode filter 1445 may also preset the selection of modcodes to be used in some systems.

Peak detection module 1440 may be utilized to determine peaks from the correlators in some embodiments. The outputs of the correlator banks may be normalized so that they can be compared against each other to pick a winner in the peak detection module. If several correlators all produce a peak output at the same time, then they may be compared and a maximum picked. The peak detector may select a maximum peak. The average peak level for each correlator may be the same at a fixed $E_s/N_o$. The following provides normalizing factors that may be utilized in some embodiments. Merely by way of example, these factors may assume MCPs of length 32, though other embodiments may utilize MCPs with different lengths.

A total power under the I or Q channels where the MCPs are may be represented as the following in some embodiments, where $M_k$ is the length of correlator k:

$$(Norm_a(k))^2 = 32 \cdot M_k \cdot \left(E_s + \frac{N_o}{2}\right).$$

A square root of the total power under the I or Q channels where the MCPs are may be represented as the following in some embodiments:

$$Norm_a(k) = \sqrt{32} \cdot \sqrt{M_k} \cdot \sqrt{E_s + \frac{N_o}{2}}.$$

A total power under the I and Q channels may be represented as the following in some embodiments:

$$(Norm_b(k))^2 = 32 \cdot M_k \cdot (E_s + N_o).$$

And a correlator output without normalization may be represented as the following in some embodiments:

$$Cor(k) = 32 \cdot M_k \cdot \sqrt{E_s}.$$

The final normalization factor was a total power under the I and Q channels. This may reduce the variance of the normalized correlator output when no signal is present since guard bands may be transmitted in empty slots in some embodiments. An average output of the normalized correlators may thus be represented as the following in some embodiments:

$$\frac{Cor(k)}{(Norm_b(k))^2} = \frac{\sqrt{E_s}}{(E_s + N_o)}$$

This shows the correlator output when normalized to the power under the correlator may not depend upon the length of the correlator so that the various length correlators when aligned in time can be compared at the same time in some embodiments.

Peak termination window 1440 may be utilized to allow decoding a data frames such as FECFRAMES to be terminated if another data frame is found overlapping the current data frame and the peak is higher in magnitude than the previous peak. Thus, in some embodiments, peak termination window 1455 may use a current peak if no larger peak arrives within the length of a received FECFRAME. If a larger peak arrives within the length of a received FECFRAME, the new peak may be used. Output from peak termination window 1455 may then provide modcode information for a data frame such as a FECFRAME. This may include, but is not limited to, modulation type, code rate, spread factor, and/or frame size, such as FECFRAME size.

Figure 15:
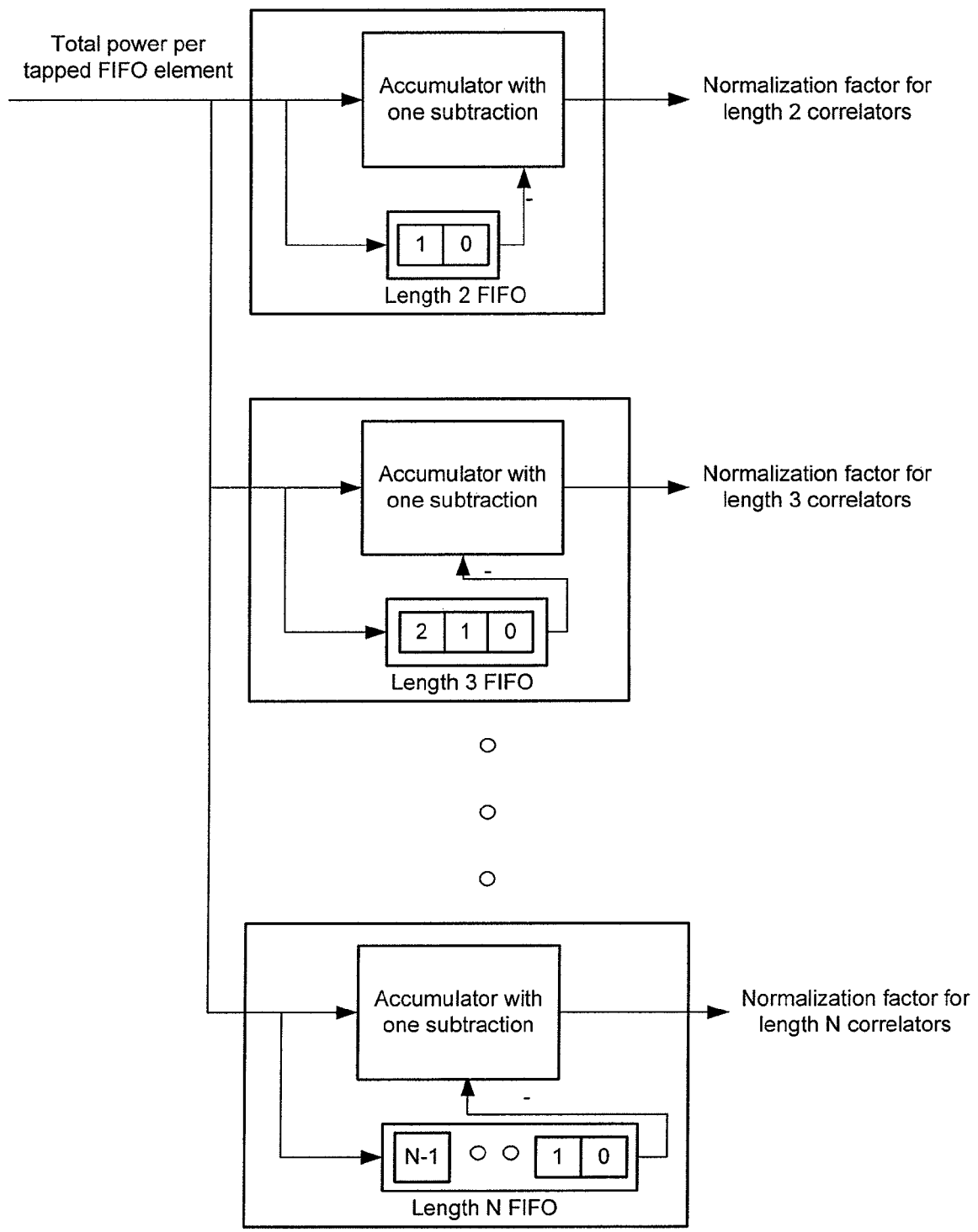
FIG. 15 is a block diagram reflecting aspects of correlators as part of a modcode detector according to various embodiments.

FIG. 15 shows a normalization for each length correlator in accordance with various embodiments. The input may be the total power computed per element of the tapped FIFOs. This may then be accumulated over the length of the correlator and used to normalize that correlator output (as shown in FIG. 16D for example, which shows an OCC correlator bank) so that peaks from each correlator can be compared. The maximum peak may be selected in the peak detection module of a modcode receiver (as shown in FIGS. 13 and 14, for example). This may be the winner. A lookup table may be used to indicate modulation, code rate/type of coding, spread factor, and FECFRAME size for that frame, merely by way of example.

Figures 16A, 16B:
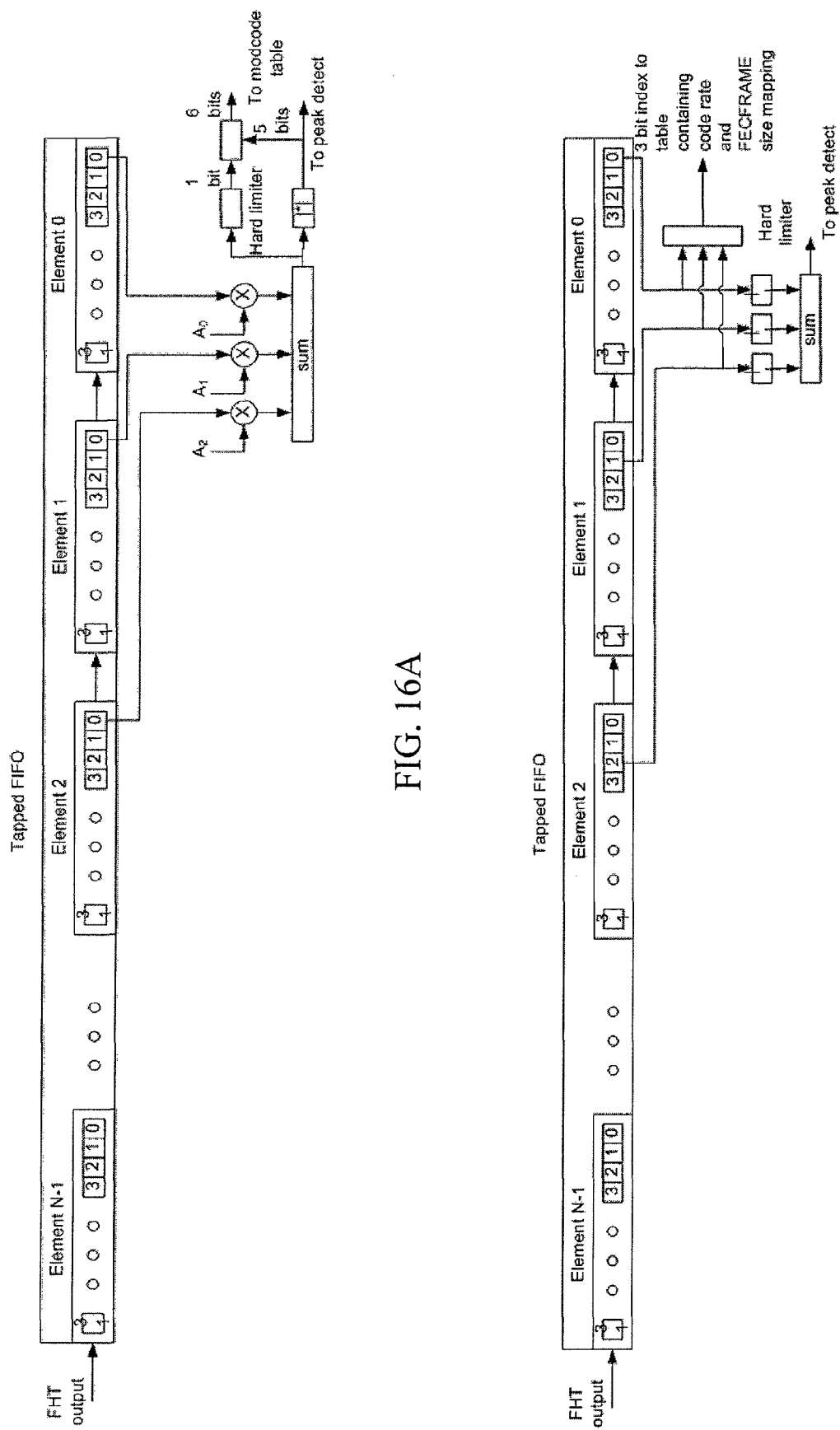
FIG. 16A is a block diagram of a correlator structure for a repetition coding according to various embodiments.
FIG. 16B is a block diagram of a correlator structure for an orthogonal variable spread factor according to various embodiments.

Merely by way of example, FIG. 16A shows correlator structures for repetition coding for a QPSK case using a Reed-Muller code such as RM(32,6). The input to the tapped FIFO may come from a FHT output on one of the channels. Each element of the tapped FIFO is 32 wide, basically, the output of the FHT. The same Walsh sequence may be used, so the correlator taps off at the same position within each element of the tapped FIFO. The 6 bit output (if this were the winner) may be the index to an ACSM modcode table as in table 700 of FIGS. 7A and 7B. The sequence $\{A_2, A_1, A_0\}$ may be a PN sequence.

Merely by way of example, FIG. 16B shows correlator structures for OVSF for al 6APSK case. The input to the tapped FIFO may come from a FHT output on one of the channels. Each element of the tapped FIFO is 32 wide, basically, the output of the FHT. Since different Walsh sequences may be used, the correlator taps off at different points within the whole tapped FIFO. The data from each tap may be fed through a hard limiter which may give a 3 bit index to a table for the code rate and FECFRAME size for this example.

Figure 16C:
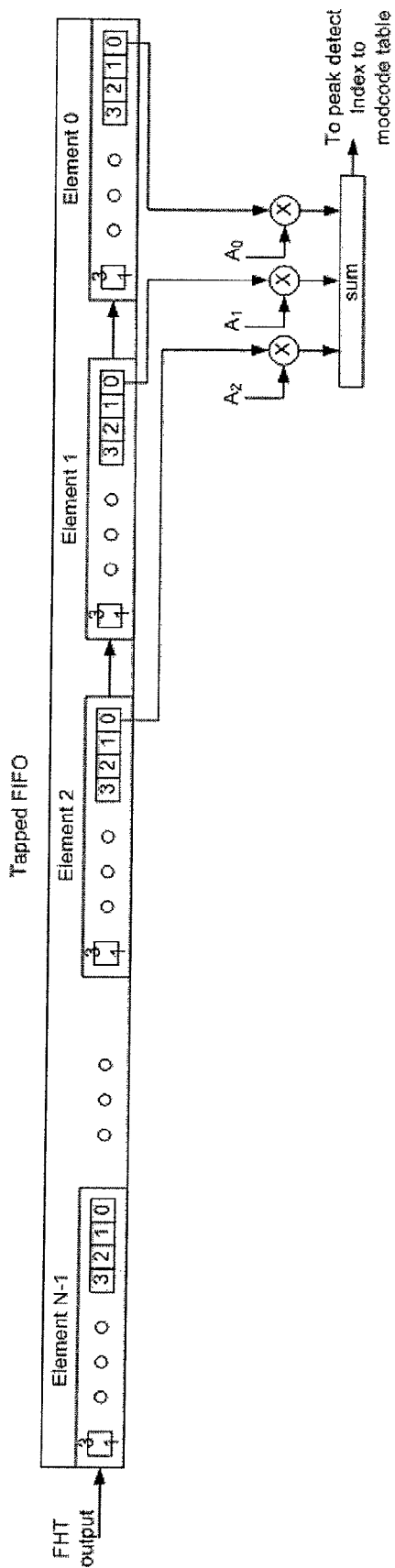
FIG. 16C is a block diagram of a correlator structure for an orthogonal code channel according to various embodiments.
Figure 16D:
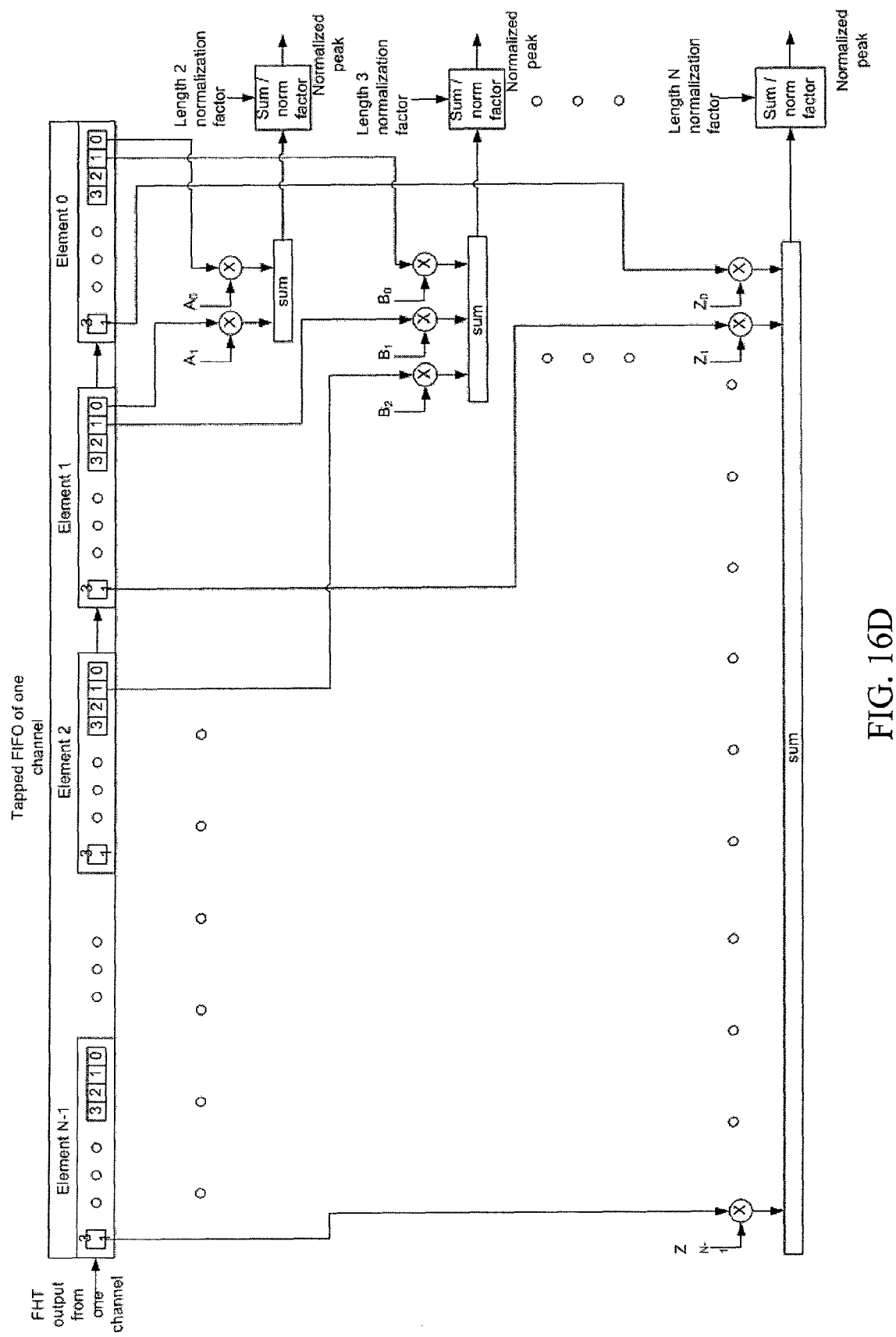
FIG. 16D is a block diagram of a correlator bank for an orthogonal code channel according to various embodiments.

Merely by way of example, FIG. 16C shows correlator structures for an OCC for an QPSK case. The input to the tapped FIFO may come from a FHT output on one of the channels. Each element of the tapped FIFO is 32 wide for this example. This is basically the output of the FHT. The same Walsh sequence may be used (not a combination of Walsh sequences as in OVSF), so the correlator taps off at the same position within each element of the tapped FIFO. The Walsh sequence and channel (I or Q) maps into one of the indices in a table such as in FIGS. 5A and 5B. The sequence $\{A_2, A_1, A_0\}$ comes from a table such as in FIG. 10 showing a PN sequence/flipping sequence used for OCC.

Merely by way of example, FIG. 16D shows one example of a correlator bank for an OCC for one channel. The length 2 correlator and its corresponding channel represents one particular modcode for 16APSK or 8PSK. The other correlators of length 2 may have the same PN sequence but may select from a different part of each element of the tapped FIFO (and select a different channel possibly). The length 3 correlator and its corresponding channel may represent one particular modcode for QPSK. Again, the other correlators of length 3 may have the same PN sequence but select from a different part of each element of the tapped FIFO (and select a different channel possibly). Finally, the length N correlator may represent the longest correlator for OCC. For this example, this would be a length 138 correlator for spread factor of 23. There can be another correlator bank for the tapped FIFO on the other channel.

Some embodiments of adaptive coding, spreading, and modulating may include interleavers and/or deinterleavers. FIGS. 11 and 13 show examples of embodiments with devices that include an interleaver and a deinterleaver respectively. These components may aid in communications environments with blockage. There are generally two types of blockage environments, but there may be others. Some blockages may be periodic. The following provides several examples including, but not limited to: a train with electrical bridges are that spaced approximately equal distances apart. or a helicopter where the blades rotate at a specific rate and have a defined width. Random blockages may also occur, due to trees and foliage and man-made objects, merely by way of example.

Some embodiments may include block interleavers/deinterleavers. A block interleaver may have M rows by N columns. This can be a simple interleaver where the columns are written in first and rows are read out at the time of transmission. The reverse operation is done at the deinterleaver. Or, this can be a random interleaver. The end-to-end delay of the interleaver and deinterleaver is approximately 2*M*N in chips. The memory of the interleaver is typically M*N in chips.

Figure 17A:
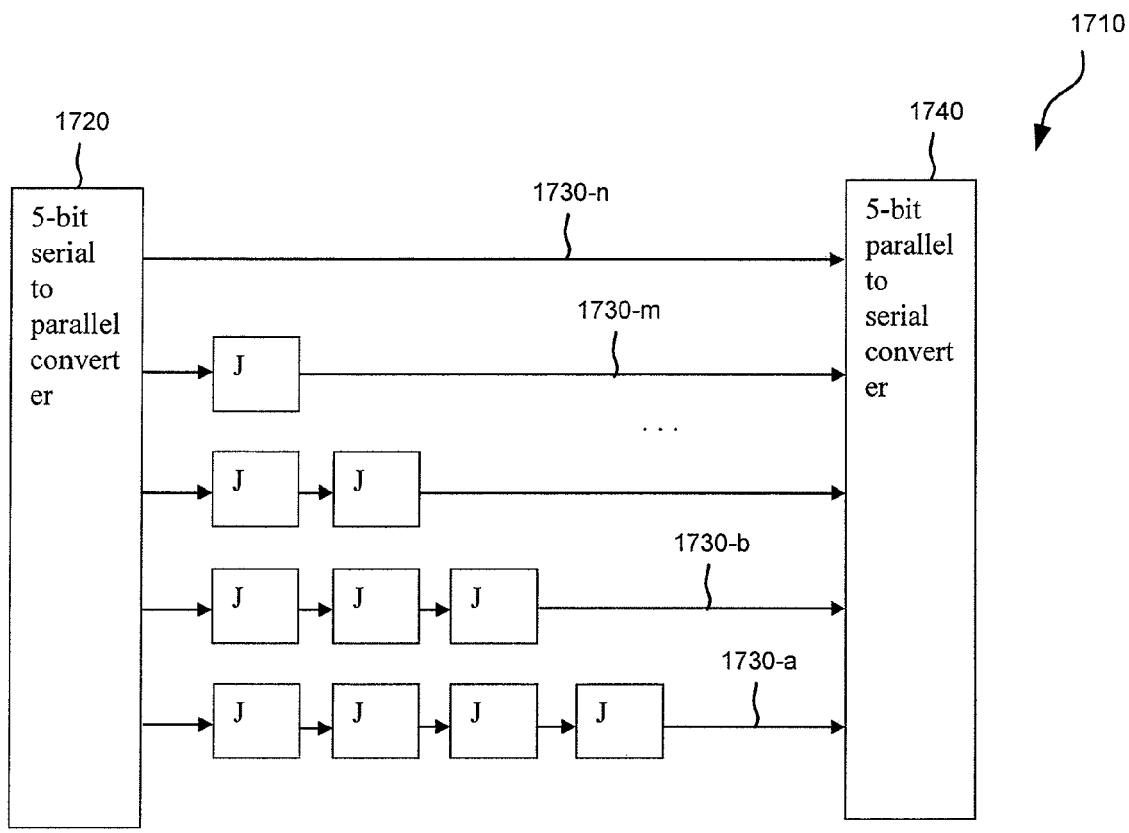
FIGS. 17A and 17B are block diagrams for a convolution interleaver and a deinterleaver according to various embodiments.

Some embodiments may include convolutional interleavers. FIG. 17A provides a diagram of convolutional interleaver 1710, merely by way of example. Convolutional interleaver 1710 may take chips in serially. After serial to parallel converter 1720, a chip is written to each branch 1730-a, 1730-b, ... 1730-n.

The other side of the interleaver reads out each branch and then serializes the chips again for transmission using parallel to serial converter 1740. Each branch of the convolutional interleaver may have a different delay of N*J where J is the depth of the memory block and N=0, 1, 2, ..., M−1. The two parameters that may describe the convolutional interleaver are the number of branches M and the depth of the memory J.

Figure 17B:
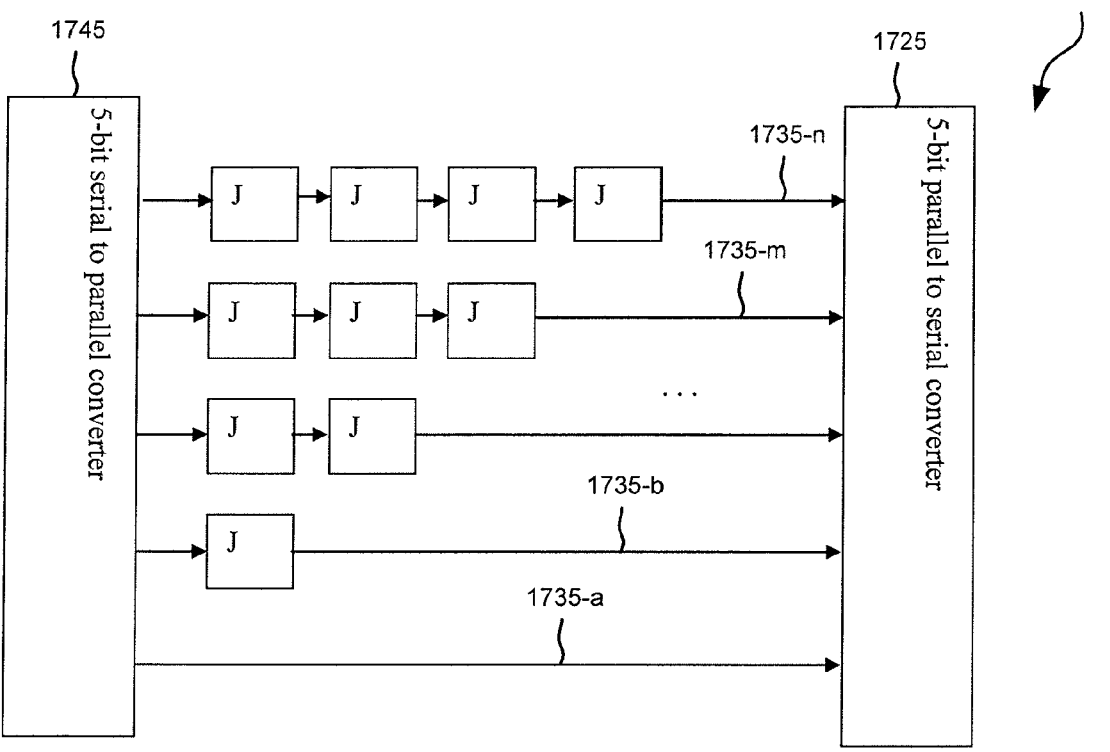

A convolutional deinterleaver provides a reverse structure of the interleaver. The delays may be symmetric after the deinterleaver. FIG. 17B shows an example of convolutional deinterleaver 1715, with serial to parallel convert 1745, branches 1735-a, ... 1735-b, and parallel to serial converter 1725. FIGS. 17A and 17B show examples with 5-bit serial to parallel converter and 5-bit parallel to serial converters along with 5 branches, which should not be seen as limiting the size of the converts and/or numbers of branches in a respective convolutional interleaver or deinterleaver. Other embodiments may include converters of different lengths and different numbers of branches.

A convolutional interleaver may have an end-to-end delay represented as M*(M−1)*J in chips. The end-to-end delay in time may be represented as M*(M−1)*J/Rc where Rc is a chip rate. The memory of the convolutional interleaver may be represented J*(M)!/[2!*(M−2)!].

The following equations provide merely one example of how to compute the number of branches (M), the depth of the memory (J) in chips, and the memory required in Mbits given the chip rate (Rc), the end-to-end delay, and the outage duration for periodic outages such as in the train and helicopter cases:

$$M = \left\lceil \frac{\text{target\_end-to-end\_delay}}{\text{target\_outage\_duration}} + 1 \right\rceil;$$

$$J = \left\lceil \frac{\text{target\_outage\_duration} \cdot R_c}{M} \right\rceil; \text{ and}$$

$$\text{memory\_required}(Mbits) = \frac{\frac{(M)!}{(2)! \cdot (M-2)!} \cdot J \cdot 2 \cdot 4}{2^{20}}.$$

Convolutional interleavers and/or deinterleavers in accordance with various embodiments may utilize a variety parameters. In some embodiments, the parameters may be adaptable to different situations. Merely by way of example, embodiments may be adapted for different target outages, or even random outages. Merely by way of example, a target outage period may include, but is not limited to, 0.006 seconds; this in particular may be applicable in the train scenario discussed above. Embodiments may be adapted to different target end-to end-delays. Merely by way of example, target end-to-end delays may include, but are not limited to 0.5 seconds, 0.4 seconds, 0.3 seconds, 0.2 seconds, and 0.1 seconds. Embodiments may also be adapted to different chip rates. Merely by way of example, chip rates may include, but are not limited to 45000000 cps, 30000000 cps, 15000000 cps, and 7500000 cps.

In some embodiments utilizing an interleaver, such as a convolutional interleaver, may result in symbols with different modulations ending up next to each other.[T&T&C2]

Some embodiments may utilize an over the air framing that may include superframes. A frame format such as that discussed above involving distributed physical layer headers and data frames may be utilized. In some embodiments, a physical layer header may be represented by modcode partitions (MCP). The modcode partitions may be concatenated with the data frame. Thee data frame may be broken into data stream units (DSU), as discussed above. In some embodiments, the frame format may then be input into a channel interleaver, such as a convolutional interleaver, as discussed above. A resulting interleaved stream may then be used to construct an interleaved superframe (ISF). In some embodiments, an interleaved superframe has a fixed length. Not all embodiments require interleaving, however.

Figure 18A:
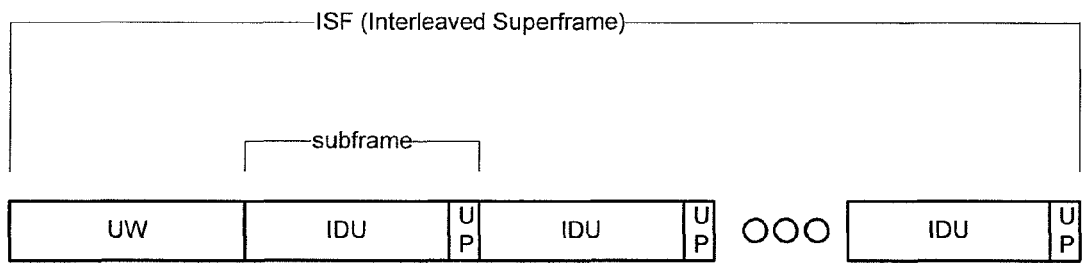
FIG. 18A is a block diagram of a interleaved superframe according to various embodiments.

FIG. 18A provide an example of a superframe, which may include interleaving. In some embodiments, an ISF may also include a unique word (UW) and unique pilots (UP). The UW and UPs may be used for acquisition, frequency estimation, and tracking, for example. In some embodiments, a UW may indicate the start of a super frame and may be used to synchronize an interleaver and deinterleaver. For example, once a UW is detected and timing is established, a receiver may know the positions of all the MCPs and DSUs in some embodiments. Also, the UW may indicate the start of a descrambler for a modcode detector. As shown in FIG. 18A, an ISF may be considered to be composed of sub-frames. Each subframe may include an interleaved data unit (IDU) concatenated with a UP. Some embodiments may include a data unit that is not interleaved.

Some embodiments may utilize different numerical relationships between different elements of a superframe. Superframe numerology may refer to the integer multiple relationships between non-interleaved data including modcode signaling overhead, and an interleaved superframe that may have unique words and unique pilots interspersed in it.

In some embodiments, superframe numerology may include, but is not limited to, a pilot percentage, a unique word size, a number of branches of the convolutional interleaver, and DSU and MCP sizes. The numerology can allow for the following, merely by way of example.

Some embodiments may include an integer number of subframes (pilot periods) per interleaved superframe (ISF). In some cases, the pilots can be up to 10% of the pilot period. Merely by way of example, a pilot percentage may typically be 5% or less depending upon the application and environment. The subframe (pilot period) length may constrained to be around 200 chips or less or more in some embodiments.

Some embodiments may include an integer number of subframes (pilot periods) per UW. This may allow for subframe synchronization before (or without) UW (superframe) synchronization and allow time and carrier tracking loops to track through the UW without having to stop or pause for different length UWs. In some embodiments, UPs may be embedded in the UW. Merely by way of example, a UW may be approximately 2% overhead. In some embodiments, UW may be 3200 chips, though other chip lengths may also be used. In some embodiments, a maximum frequency offset may be up to 1 MHz for DROs and after acquisition, the frequency offset is less than 10 kHz.

In some embodiments, there may be an integer number of modcode data stream units (MDU=MCP+DSU) per de-interleaved superframe (DSF). The location of the MCPs may be known within the de-interleaved superframe and its period. This may simplify the modcode receiver structure. In some embodiments, the MCP is a minimum of 32 chips.

In some embodiments, a channel interleaver/deinterleaver may be synchronized to the UW such that the first branch of the convolutional interleaver (channel interleaver) after the UW is zero-th branch and the last branch before the UW is the (M−1)th branch for an interleaver of M branches. This may allow the interleaver and deinterleaver to run continuously in some embodiments, so that the branch does not have to restart or reset. Merely by way of example, the number of branches may vary from 1 up to 90 to give end-to-end delays of 0.1 up to 0.5 seconds for the convolutional interleaver. With only 1 branch, the interleaver may operate in bypass mode.

In some embodiments, an ISF may be constrained to be around 6 msec. This is the approximate duration of the outage for the train case discussed above for a given chip rate. Other embodiments, however, may have different constraints with respect to the ISF.

As noted above, FIG. 18A shows an interleaved superframe (ISF) structure. In some embodiments, the UPs have a PN sequence imposed upon them. This may help a carrier tracking loop resolve phase ambiguity. The PN sequence may be repeated every superframe.

The equations below summarize the general constraints listed above. The lengths are all in chips.

$$ISF_{length} = N_1 \cdot Subframe_{length} + UW_{length}$$

$$Subframe_{length} = UP_{length} + IDU_{length}$$

$$UW_{length} = N_2 \cdot Subframe_{length}$$

$$ISF_{length} - UW_{length} - N_1 \cdot UP_{length} = N_3 \cdot M$$

where M is the number of branches of the convolutional interleaver and $N_1$, $N_2$, and $N_3$ are integers.

Figure 18B:
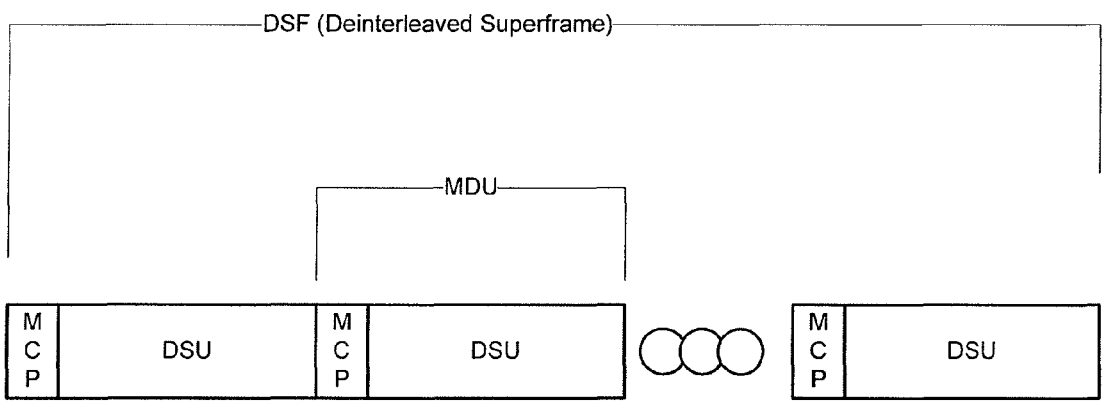
FIG. 18B is a block diagram of a deinterleaved superframe according to various embodiments.

FIG. 18B shows a deinterleaved superframe (DSF) structure. The DSF in this example has had the UW and UPs removed. The IDUs have been concatenated and run through the deinterleaver to form the modcode data units (MDUs); an MDU may include a modcode partition (MCP) portion and a data stream unit (DSU) portion in some embodiments. The equations below summarize general constraints that may be imposed on the DSF structure.

$$N_4 = MDU_{length} = N_1 \cdot IDU_{length}$$

$$MDU_{length} = MCP_{length} + DSU_{length}$$

where $N_4$ is also an integer.

Figure 19:
FIG. 19 illustrates an example of a frame structuring table according to various embodiments.

FIG. 19 provides table 1900 that summarizes various framing structures in accordance with various embodiments. Merely by way of example, the pilot percentages are varied (1%, 5%, and 10%) while keeping the ISF duration to ~6 msec for 28.8 Mcps. The total ISF duration varies from 5.85 msec to 6.12 msec. These specific numbers are utilized merely for example purposes and should not be seen as limiting other possible configurations, which may utilize different lengths, durations, and percentages.

Figure 20A:
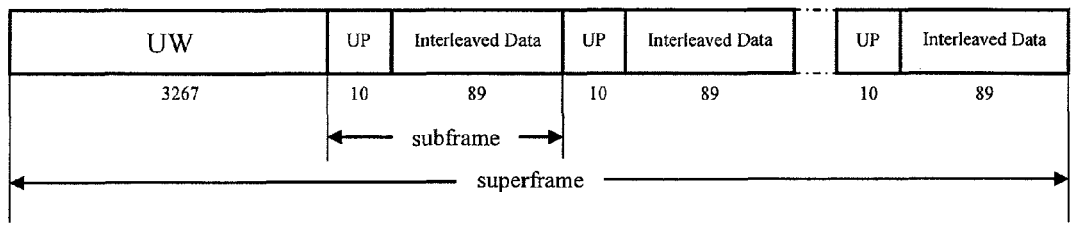
FIG. 20A is a block diagram of a superframe according to various embodiments.

Some embodiments that utilize a unique word and unique pilots structure, as with the superframe structure discussed above, may utilize the UWs and UPs for synchronization and acquisition purposes. Acquisition may be a 2-staged process wherein a receiver is initially synchronized to the UPs, a process that may be known as subframe synchronization. FIG. 20A shows one example of an underlying superframe structure with specific chip lengths for the UW, the UPs, and the interleaved data. FIG. 20A shows the UP at the start of the subframe. This should not be seen as limiting as other possible locations for the UP may be used for other embodiments. These chip lengths are merely provided for explanation purposes and should not be seen as limiting on other possible values that may be used for other embodiments. In addition, in this example, UPs have been prepended to interleaved data units, while in other embodiments, UPs may be appended to interleaved data units. Some embodiments may also not involve interleaved data.

In FIG. 20A, each superframe includes a unique word. A UW may serve as a preamble and a delimiter for superframe boundaries. This example also includes 1638 subframes, though other superframes may include a different number of subframes. Each subframe is made up of a 10 chip pilot and 89 chips of interleaved data for this example, which is a payload as far as the acquisition layer may be concerned. Pilots may serve multiple purposes for acquisition and timing and frequency tracking. Pilot length and interleaved data length may vary for other embodiments. Acquisition may be done in 2 parts. First subframe synchronization may be performed, followed by superframe synchronization. One may note that in some embodiments, this order may be reversed.

Figure 20B:
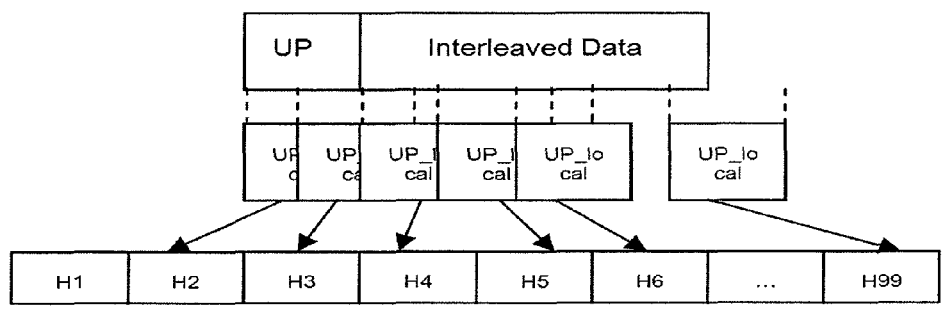
FIG. 20B is a block diagram reflecting sub-frame synchronization according to various embodiments.

Referring to FIG. 20B, this figure provides a schematic for a subframe synchronization process. In this example, initially a 99 cell circular buffer (where 99 equals a UP length plus a data unit length) may be continually updated with results of the correlations between the 10 chip local pilot copy and incoming received signal. Soft correlations may be circularly accumulated for 5 super-frames allowing 8190 (1638×5) pilots to contribute to the soft decisions. 99 hypothesis may be taken and sync declared. Other embodiments may utilize other numerical values for a subframe synchronization process.

In embodiments where a unique word size is in an integer multiple of the subframe size, the relative time offset of the local pilot copy to the subframe may remain the same and allow further energy accumulation across multiple superframes. 1 MHz frequency offset may be assumed at this stage of acquisition in some embodiments. Other offsets may be utilized in other embodiments.

Figure 20C:
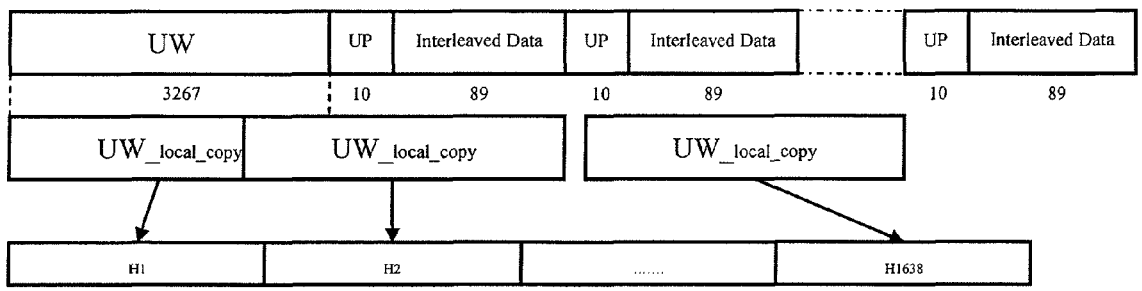
FIG. 20C is a block diagram reflecting superframe synchronization according to various embodiments.

Referring now to FIG. 20C, this figure provides one schematic for a superframe synchronization process. Achieving sub-frame synchronization may not produce the knowledge of super-frame boundaries, which may be needed for subsequent operations. In this example, gaining sub-frame boundary knowledge leaves may provide 1638 hypothesis as to where the UW boundaries are.

A similar mechanism may achieve superframe synchronization in some embodiments. In this example, a 1638 cell circular buffer may be continually updated with results of the correlations between the 3267 chip local copy of the UW and the incoming received signal, except only with chunks of the signal immediately preceding the sub-frame start time or any (0 to 1637) integer multiple. This is done because after sub-frame synchronization is achieved it is known that the UW is located CX(sub-frame length) away from the start of the current subframe, where C is an integer from 0 to 1637. After accumulating energy over 5 super-frames, for example, a maximum hypothesis may be selected and super-frame synch is declared. Due to a parallel mechanism of frequency offset estimation, which provides coarse frequency offset correction, the frequency offset at this stage may be assumed to be 250 KHz in some embodiments. Other embodiments may utilize other numerical values for a superframe synchronization process.

In some embodiments, a coarse frequency estimation may be done after subframe synchronization. It may use Ups to reduce a frequency offset from 1 MHz to 250 kHz, merely by way of example. A fine frequency estimate may be done after a superframe synchronization. This may bring a frequency offset down to less than 10 kHz using the UWs, merely by way of example.

Due to a large frequency offset that may be present at stages of acquisition and considerable lengths of sequences to be correlated against, partially coherent correlation may be implemented at both stages of acquisition in some embodiments. The size of the frequency offset at any given stage of acquisition may determine the longest coherent period over which traditional coherent correlation can be performed without a significant degradation of the resulting decision statistic. Merely by way of example, frequency offsets of 1 MHz and 250 KHz at first and second stages of acquisition respectively may be utilized, resulting in corresponding selections of N (coherent period) of 5 and 27 chips, for this specific example. An integer number of these coherent integrations may be summed up non-coherently to improve the reliability of the decision statistic. The algebraic expression below summarizes one possible formula for the decision statistic for arbitrary values of N and L:

$$DS = \sum_{i=1}^{L} \text{coh\_corr}_i, \text{ where coh\_corr} = \frac{\left|\sum_{j=1}^{N} x_j \cdot C_j^*\right|^2}{\sum_{j=1}^{N} |x_j|^2}.$$

Here $C_j$ is complex symbol representing the local copy of the sequence one may be trying to synchronize with. $x_j$ is a received complex sample. The normalization in the expression for the coherent correlation may serve the purpose of limiting the value span of the coherent correlation regardless of the power present in the signal segment that is being correlated.

During the first stage of acquisition, 10 chip pilots may be utilized for this example based on the above discussion. Since N=5 was selected, this may lead to two post detection integrations per pilot, i.e. L=2. Due to a smaller frequency offset at the UW synchronization stage, N=27 may be selected, leading to L=121 (since 27×121=3267, the UW length). Other embodiments, once again, may utilize different numerical values.

Some embodiments may include a timing loop that may complete a fine acquisition of the symbol timing after initial coarse symbol timing has been acquired through the acquisition mechanism, such as that discussed above. In some embodiments, it may be assumed that the acquisition mechanism will provide an estimate of the symbol timing that will at most be ½ of the chip period away from the ideal sampling point.

Figure 21A:
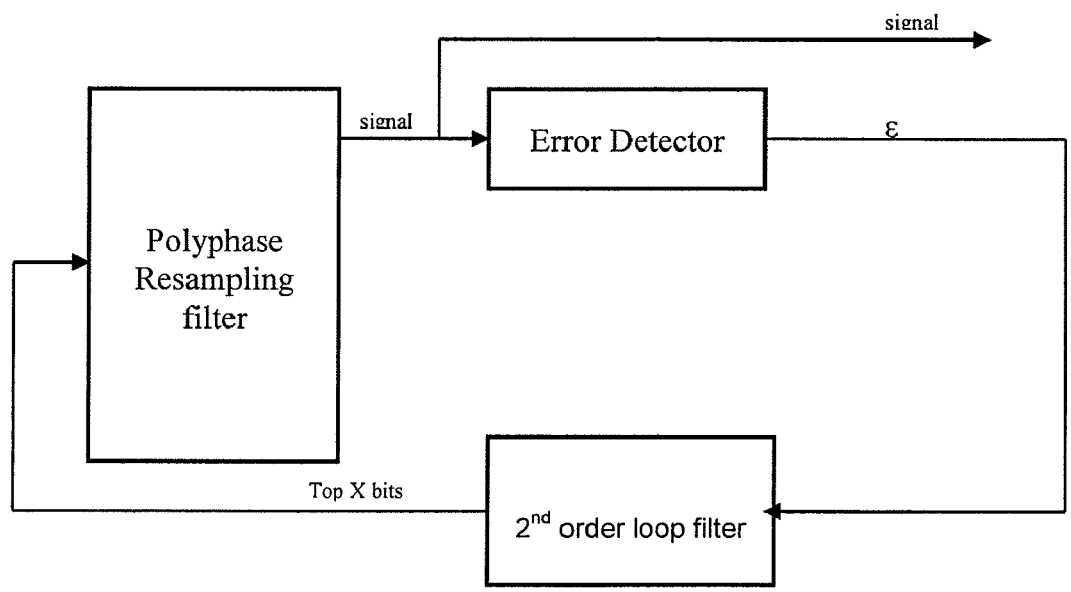
FIG. 21A is a block diagram of a timing loop according to various embodiments.

FIG. 21A shows a block diagram that provides a high level view of a timing loop in accordance with various embodiments. Error detector may operate at the sample rate outputting an error signal proportional to the timing error. Loop filter may accumulate multiple error samples in an accumulator. In some embodiments, a certain number of most significant bits (MSBs) of error samples may provide a phase value for the down sampling Polyphase filter; in one embodiment, 7 MSBs may be used. A more detailed discussion of each of the blocks is to follow in later sections.

Some embodiments may involve low Es/No requirements (as low as −17 dB, merely by way of example). A data aided timing loop may be used in some embodiments as a result. A non-data aided timing loop may also be used in some embodiments. In a conventional (non-data aided) loop, an error detector may output a signal based on three measurements: early, on-time, and late. Some embodiments may utilize a detector equation for non-data aided tracking as the following:

$\epsilon = (\text{On\_time\_}I) \times (\text{Late\_}I - \text{Early\_}I) + (\text{On\_time\_}Q) \times (\text{Late\_}Q - \text{Early\_}Q).$ This approach, however, may rely on a reasonably reliable on time sample, which may not be very reliable at low Es/No. To improve the low Es/No performance of the loop, data aided approach may be utilized in some embodiments. In data-aided tracking, periodic pilots, such as the unique pilots discussed above, may be inserted into the data. During the periodic pilot, the signal may be a sequence that is known to a receiver. This knowledge can enable an error detector to use a locally generated copy of the same sequence and not rely on a noisy sample like in non-data aided detectors. In some embodiments, an issue of phase ambiguity may need to be addressed in data-aided loops unlike in non-data aided loops. Phase ambiguity may be present because embodiments may assume no PLL lock when symbol timing is being tracked. Since embodiments may depend upon an accurately preserved sequence, an error detector may need to be immune to phase uncertainty. In some embodiments, this may be accomplished through the following error detector such as that shown in FIG. 21B.

Figure 21B:
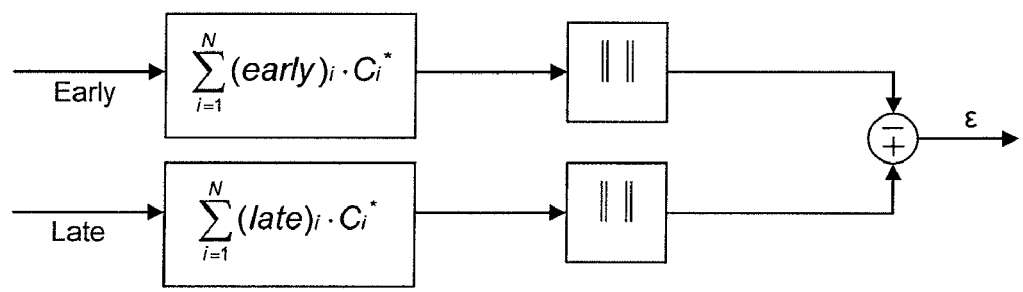
FIG. 21B is a block diagram of an error detector according to various embodiments.

In some embodiments, late and early inputs may be complex samples that are correlated with a local copy of a pilot sequence C. This sequence may be a fixed sequence of length 10, merely by way of example for an embodiment with pilots of length 10. Chip transitions within the pilots (from −1 to 1 etc) may occur in order for the error detector to produce a non-zero output. In some embodiments, a sequence that may provide a maximum number of such transitions is a ZOZO pattern. A ZOZO pattern, however, may lead to a noticeable rise in the spectral content due to the presence of a tone-like signal. In some embodiments, an inverting/non-inverting pattern (overlay sequence) can be used to preserve spectral flatness. An overlay sequence may not have to be known at the detector due to the abs( ) operators as shown in FIG. 21B. As an alternative, a Barker sequence may also provide acceptable good spectral flatness while still containing a sufficient number of transitions. Since the correlation length is 10 for this example, only one c output may be generated per pilot. The magnitude operator has the effect of removing phase uncertainty out of the equation. As noted above, other embodiments may include pilots with other lengths.

Figure 21C:
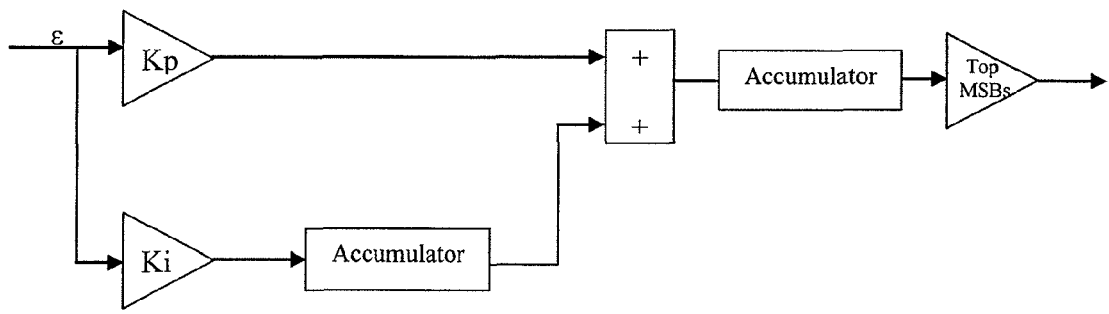
FIG. 21C is a block diagram of a loop filter according to various embodiments.

Some embodiments may utilize a second order loop filter in a timing loop, as shown in FIG. 21A. FIG. 21C provides a diagram of one such filter in accordance with various embodiments. The contents of the rightmost accumulator may contain a sum of a proportional (instantaneous error due to 1 pilot) and an integral path (linear term constantly updated by instantaneous errors). The final accumulator may be 32 bits in some embodiments, top 7 MSBs of which may be used to correct the error, though other numbers of MSBs may be utilized in some embodiments. This may provide 25 bits of room to accumulate the error estimate and make it more reliable, merely by way of example. Other embodiments may include accumulators of different lengths with different numbers of MSBs used to correct an error.

Figure 21D:
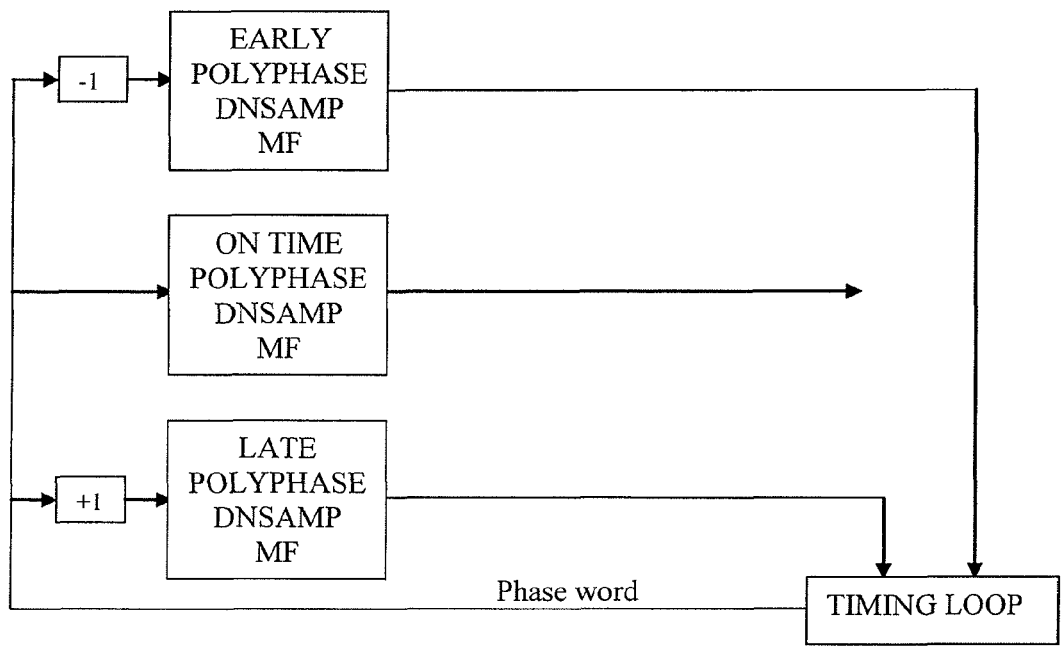
FIG. 21D is a block diagram of a polyphase downsampling filter according to various embodiments.

After passing through a loop filter, the accumulated error estimate may be applied to the incoming signal through the error adjustment mechanism in some embodiments. The error signal may serve as a phase signal for a Polyphase downsampling filter as shown in FIG. 21D. This may lead to adjustments in the delay of the MF impulse response and in turn may change the sampling point. As the sampling point approaches the optimal and the difference between late and early samples diminishes, the loop may converge towards lock. In some embodiments, a timing loop may freewheel during a period when pilots may not be present.

Figure 22:
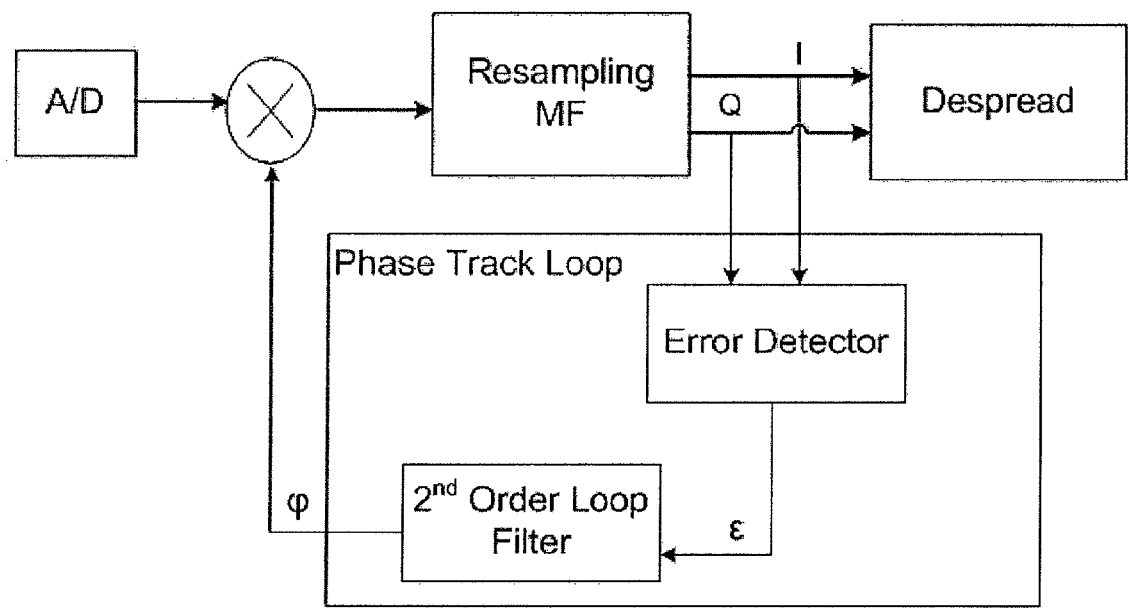
FIG. 22 is a block diagram of a phase tracking loop according to various embodiments.

Some embodiments may also utilize a carrier phase tracking loop filter. A phase tracking loop, such as an ACMS phase tracking loop, may take I and Q data in chips, and produce phase correction at the sampling rate to feed the complex rotator in some embodiments. FIG. 22 shows a generalized block diagram for a phase tracking loop in accordance with various embodiments.

Applications such as ACSM may need a phase tracking loop to accurately track carrier frequency and phase at low Echip/No (down to −17 dB Echip/No or even lower in some cases). To resolve this challenge, a data-aided (DA) error detector may be used. With a DA error detector, a pilot sequences of known pattern may pre-pended (or appended in some cases) to a data chip stream, through which performance improvement in Echip/No may be achieved by the correlation over the pilot sequence. In some embodiments, a pilot sequence may be a unique pilot. Since piloting adds to system overhead, the option of using the conventional non-data aided (NDA) loop may be utilized in some embodiments for high Echip/No operations.

In some embodiments, a phase tracking loop may take I and Q chips after a resampling matched filter. The input chip stream may be stream of superframes in some embodiments. Merely by way of example, a superframe may include roughly 163200 chips, though as discussed else, other chip lengths may also be utilized. A superframe may begin with a Unique Word (UW) portion of roughly 3200 chips (for illustration purpose only, actual numbers may be different). The UW may be used for frequency acquisition purpose as discussed above, and since it is a pre-defined known sequence, it can also be used in loop to facilitate frequency pull-in and frequency and phase tracking in some embodiments. After a UW, a payload portion of the superframe may include repetitions of pilot and transmit data for Data-Aided (DA) approach or just transmit data for the Non-Data Aided (NDA) approach in some cases. Merely by way of example, superframe structure may have length 163200 chips, with a UW of length 3200 chips and a pilot period of 200 chips. Pilot lengths may vary; for example a pilot length may be 10 chips for a 5% pilot ratio or possibly 20 chips for a 10% chip ratio. A pilot of length 0 may be used for a non-data aided approach, which does not rely on piloting. As noted here and else, these numbers are to aid in explanation, while other numbers will work within the scope and spirit of the disclosure. In some embodiments, the pilot period may include both a data payload portion and a pilot portion. The data payload portion may be an data unit as discussed above; it may be interleaved in some cases, creating interleaved data units (IDUs).

In some embodiments, an NDA mode may operate for reasonably high Ec/No environments. It may support QPSK and π/2-BPSK modulation points, merely by way of example.

Figure 23:
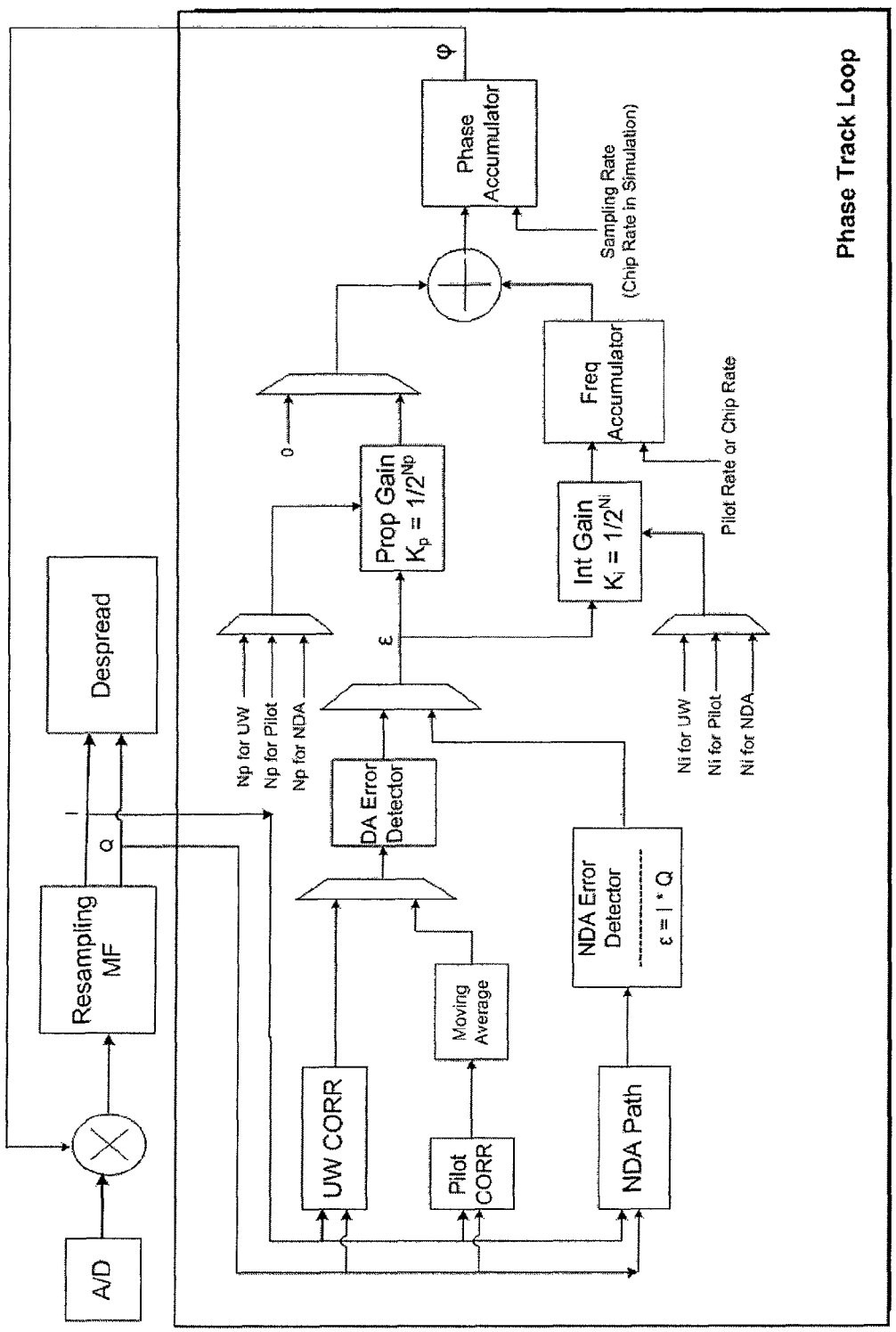
FIG. 23 is a block diagram of a phase tracking loop according to various embodiments.

FIG. 23 provides a baseline block diagram for a phase tracking loop in accordance with various embodiments. In some embodiments, this may be an ACSM phase tracking loop. As can be seen from the figure, the loop may include both an NDA path and a DA path. The DA path may utilize 5% or 10% pilots, for example, that are inserted to assist the phase tracking in low SNR environments. The DA path may include carrier and phase tracking for the UW portion and the payload portion. Since both may have known data pattern to assist the phase error estimation, the same phase error detector can be used in some embodiment, and is shown as the DA Error Detector in the block diagram. The $2^{nd}$ order loop filter design may be the same for NDA mode, UW and payload portions of the DA mode, the differences may be the gains for the proportional and integral paths and the clock rate for the frequency accumulator module, given the different update rate for the phase error −ϵ.

Some embodiments may utilize an NDA as part of a loop design. It may be used for high SNR applications, merely by way of example. In the NDA mode, the phase error detector may operate on the in-phase (I) and quadrature (Q) components of the data symbols, and the detector may compute a phase error using the following formula such as the following:

$$\epsilon = I \times Q$$

Embodiments with NDA may resemble a sin*cos type phase detector as it may rely on the fact that the multiplication of I and Q maps to a BPSK signal. In some embodiments, this mode may work for QPSK or lower modulated data stream. Embodiments may generate a phase error estimate every chip. As a result, a frequency accumulator may be updated at the chip rate as well in some embodiments. The quality of the phase error estimate may be highly sensitive to the SNR. In some embodiments, high SNR would make reasonable phase error estimate for the loop to track properly.

In some embodiments, pilots are predefined data patterns mapped to symbols, such as QPSK symbols for example, and prepended or appended to the payload chips. Pilots may be used to improve the Echip/No to the point that phase tracking loop can perform well. Embodiments may capitalize on the correlation on pilots to recover signal quality in low Echip/No environments, and generally, the longer the pilot, the better Echip/No improvement can be achieved to combat the thermal noise.

Pilots may be discarded at a demod and may contribute to system overhead, and adversely impact system throughput. By trading off the signal quality gain and system throughput, different pilot ratios may be used. For example, pilot ratios of 5% or 10% may be used in some embodiments. Merely by way of example, pilot structures having 10 pilots per 200 chips (pilot period) for 5% pilot ratio, and 20 pilots per 200 chips for 10% pilot ratio may be used in some embodiments, though other ratios may be used within the scope and spirit of the disclosure.

Merely by way of example, QPSK mapped pilots or UW chips may remapped to BPSK signal (phase 0) via correlation, the correlator output may feed the Data-Aided (DA)

Error Detector module of FIG. 23. Different types of phase error detectors may be used for ACSM phase tracking loop DA Error Detector. For example, an a tan 2-type and a sin*cos-type detector may be used. The a tan 2-type error detector may compute the phase error using a formula such as following:

$$\epsilon = a\tan 2(\text{imag}(\text{Complex\_Input}) \div \text{real}(\text{Complex\_Input})),$$

where Complex_Input is the correlator output and is a complex scalar, and a tan 2 is a function which return the a tan value in the 4-quandrant radians. For instance, a tan 2((−1)/(1)) returns −pi/4 whereas a tan 2((1)/(−1)) returns 3*pi/4. A tan 2-based loop design pulls the correlated BSPK signal to 0° phase, and thus may be sensitive to the overlay pattern of the pilot sequence; in other words, the overlay pattern of the pilot sequence may need to be known in order for it to work.

On the other hand, the sin*cos-type error detector may be capable of pulling the loop to either 0° phase or 180° phase dependent on the polar location of the correlator output. It may use the following formula to compute the phase error:

$$\epsilon = \text{imag}(\text{Complex\_Input}) \times \text{real}(\text{Complex\_Input}),$$

where Complex_Input is the correlator output and is a complex scalar. The sin*cos-based loop may provide flexibility, given that it can pull the loop to either 0° phase or 180° phase, it may be able to track the phase even if the overlay pattern of the pilots is unknown.

Loop gains for tracking and initial frequency pull-in may be different in some embodiments; tracking loop gains may generally be weaker than an initial frequency pull-in loop gains. A proportional gain Kp may be computed as:

$$Kp = 1/(2^{Np}),$$

where Np is a configurable parameter that may need to be adjusted for different SNR levels. Different loop gains may be used for frequency pull-in and tracking.

Some embodiments may utilize a concatenating/combining pilots approach that concatenates/combines multiple pilots from multiple pilot periods, and rotates the concatenated longer pilot on a second complex rotator with based on the latest available frequency estimate and phase and absolute offsets to compute the estimated phases for all the combined pilots. This may provide longer correlations that may provide better Ec/No improvement, and combining pilots may extend the correlator length without increasing the pilot length or ratio.

Some embodiments may utilize an output averaging scheme that computes the moving average of the correlator outputs of multiple pilot periods, and feeds the computed average instead of the correlator output of the current pilot period into the error detector. FIG. 23 shows an embodiment that may utilize a moving average. Some embodiments may be applied only on the payload portion of the superframe for the DA mode.

In some embodiments, the loop may freewheel through periods where pilots and unique words are not present. In this case, ε may be zero in some embodiments. Some embodiments may utilize an average that has already been determined. These values may be used until a unique word or pilot is detected again.

Embodiments utilizing averaging may include a configurable parameter for the number of correlator outputs. Averaging may be applied based on an Ec/No. Merely by way of examples, some embodiments may utilizing an average for low Ec/No (below 0 dB for example) while not utilizing averaging for high Ec/No (above 0 dB for example).

Figure 24:
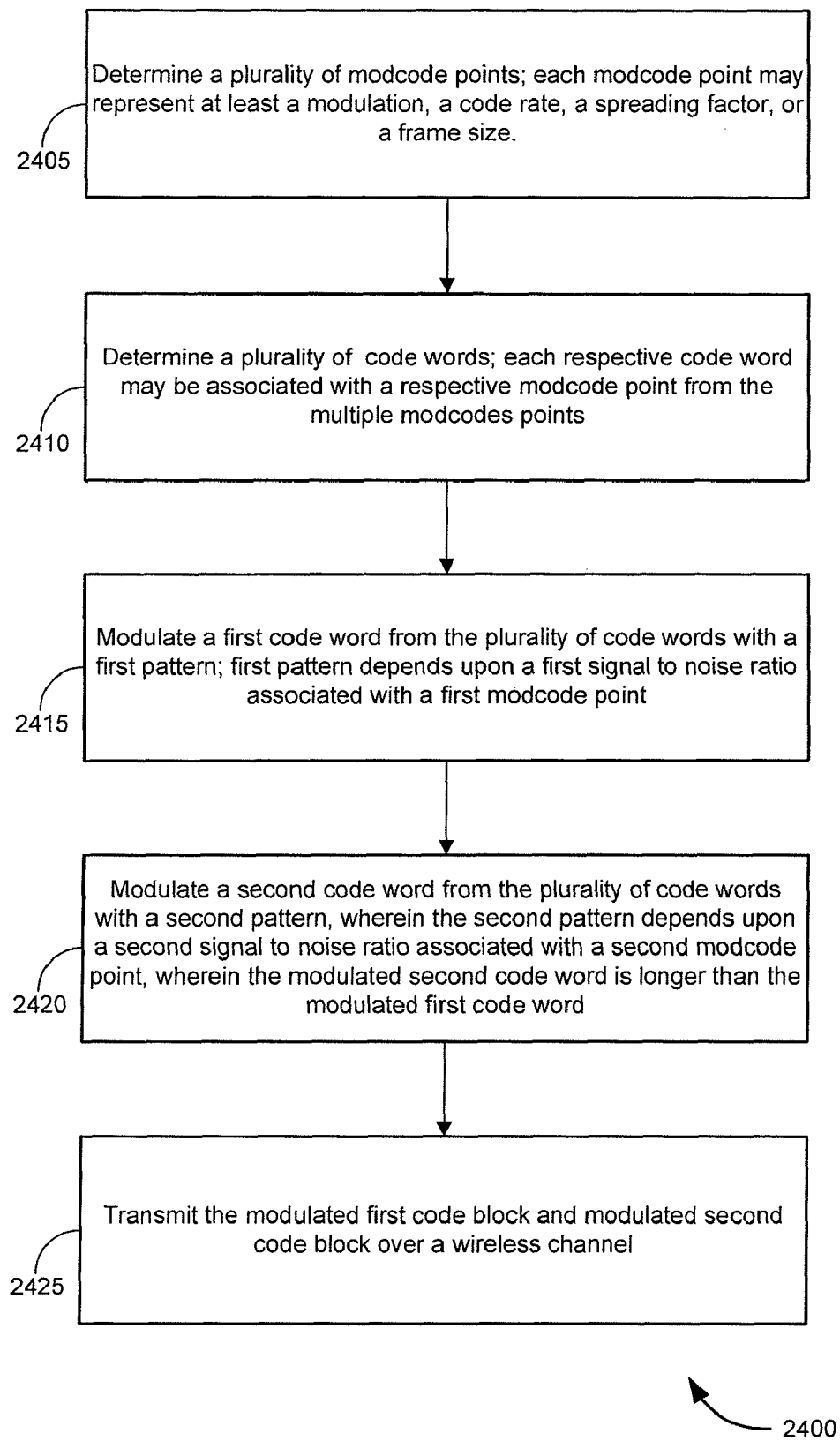
FIG. 24 is a flowchart illustrating a method for efficient control signaling over shared communication channels according to various embodiments.

FIG. 24 is a flowchart illustrating a method 2400 for efficient control signaling over shared satellite communication channels. The method may be performed, for example, in whole or in part, by system 100 of FIG. 1 or device 1100 of FIG. 11 or device portion 1200 of FIG. 12. At block 2405, multiple modcode points may be determined. Each modcode point may represent at least a modulation, a code rate, a spreading factor, or a frame size. At block 2410, multiple code words may be determined. Each respective code word may be associated with a respective modcode point from the multiple modcodes points. At block 2415, a first code word from the multiple code words may be modulated with a first pattern. The first pattern may depend upon a first signal to noise ratio associated with a first modcode point. At block 2420, a second code word from the multiple code words may be modulated with a second pattern. The second pattern may depend upon a second signal to noise ratio associated with a second modcode point. In some embodiments, the modulated second code word may be longer than the modulated first code word. At block 2425, the modulated first code block and modulated second code block may be transmitted over a wireless channel. In some embodiments, the modulated first code word may not be decodable by a terminal that can decode the modulated second code word.

Figure 25:
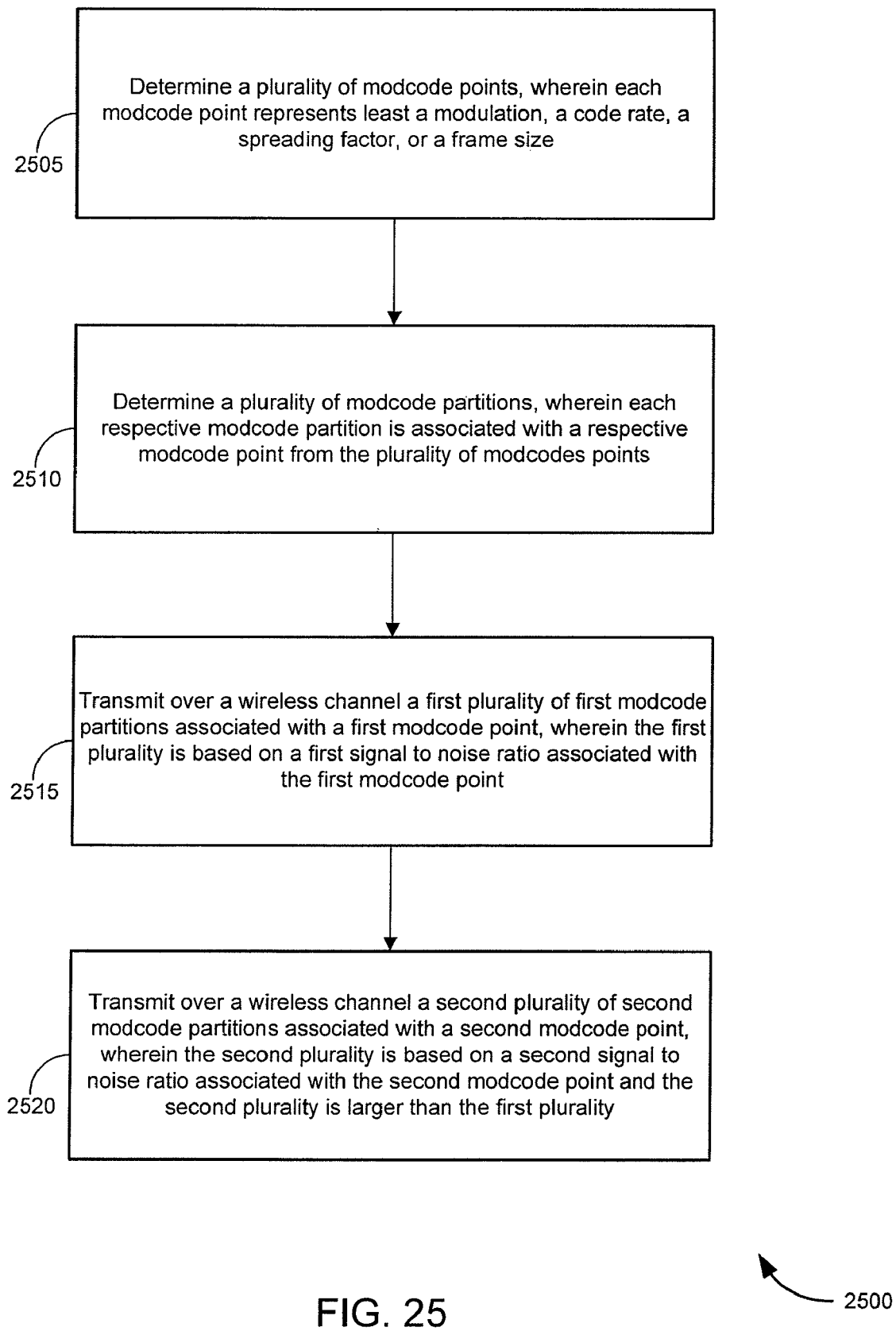
FIG. 25 is a flowchart illustrating a method for efficient control signaling over shared communication channels according to various embodiments.

FIG. 25 is a flowchart illustrating a method 2500 for efficient control signaling over shared satellite communication channels. The method may be performed, for example, in whole or in part, by system 100 of FIG. 1 or device 1100 of FIG. 11 or device portion 1200 of FIG. 12. At block 2505, multiple modcode points may be determined. Each modcode point may represent a modulation, a code rate, a spreading factor, and/or a frame size. At block 2510, multiple modcode partitions may be determined. Each respective modcode partition may be associated with a respective modcode point from the multiple modcodes points. At block 2515, multiple copies of a first modcode partition associated with a first modcode point may be transmitted over a wireless channel. The number of copies may be based on a first signal to noise ratio associated with the first modcode point. At block 2520, multiple copies of a second modcode partitions associated with a second modcode point may be transmitted over the wireless channel. The number of copies of the second modcode partition may be based on a second signal to noise ratio associated with the second modcode point. The number of second modcode partitions transmitted may be greater than the number of first modcode partitions transmitted.

In some embodiments, the method for efficient control signaling over shared communication channels may include a number of first modcode partitions that may be of sufficient length for a first receiver to decode the first number of modcode partitions and to determine the first modcode associated with the first plurality of first modcode partitions while the first number of first modcode partitions is of insufficient length for a second receiver to decode the first number of modcode partitions and to determine the first modcode associated with the first number of first modcode partitions.

In some embodiments, the method for efficient control signaling over shared communication channels may include modcode partitions that are represented by at least a portion of a Walsh code. In some embodiments, modcode partitions may be spread using a spread factor. In some embodiments, the method for efficient control signaling over shared communication channels may include modcode partitions that are distributed within a data frame. The modcode partitions may be distributed within the data frame at known locations. The modcode partitions may be distributed within the data frame such that the data frame is segmented into equal portions. In some embodiments, the modcode partitions may all have the same length.

Figure 26:
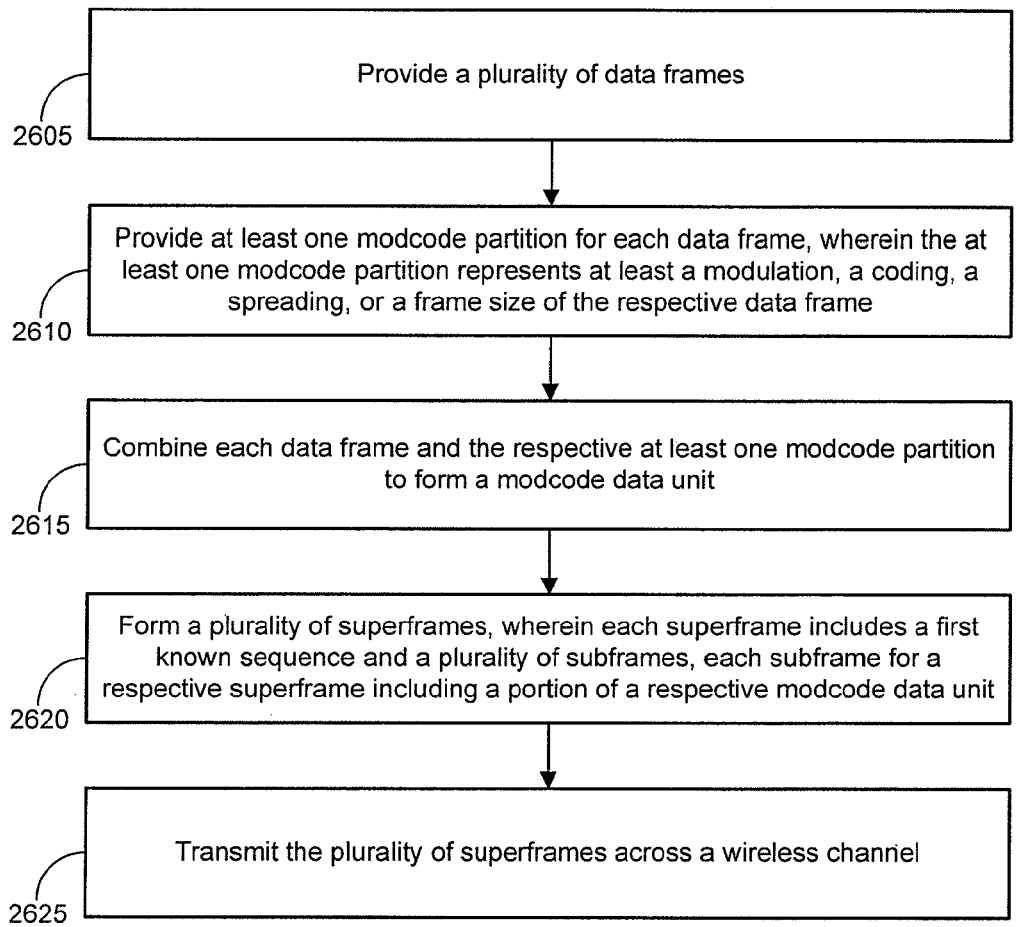
FIG. 26 is a flowchart illustrating a method of adaptive coding, sampling, and modulating over a satellite communication channel.

FIG. 26 is a flowchart illustrating a method 2400 of adaptive coding, sampling, and modulating over a satellite communication channel. The method may be performed, for example, in whole or in part, by system 100 of FIG. 1 or device 1100 of FIG. 11, device portion 1200 of FIG. 12, device 1300 of FIG. 13, or device 1400 of FIG. 15. At block 2605, multiple data frames are provided. At block 2610, at least one modcode partition may be provided for each data frame. The modcode partitions may represent modulation, coding, spreading, and/or frame size information for respective data frames. At block 2615, each data frame and the respective modcode partition may be combined to form a modcode data unit. At block 2620, multiple superframes may be formed. Each superframe may include a first known sequence and multiple subframes. Each subframe for a respective superframe may include a portion of a respective modcode data unit. At block 2626, multiple superframes may be transmitted across a wireless channel.

In some embodiments, the first known sequence is a unique word. Some embodiments may include inserting a second known sequence into at least one of the subframes of a respective superframe. Inserting the second known sequence may depend on a signal to noise ratio associated with a receiver of the respective superframe.

In some embodiments, each respective subframe includes a respective second known sequence from a plurality of second known sequences. Each respective second known sequence may be a respective known pilot sequence.

Some embodiments may include interleaving the modcode data unit. Interleaving the modcode data unit may involve using a convolutional interleaver. Interleaving the modcode data unit may result in interleaved data including a first symbol with a first modulation next to a second symbol with a second modulation, wherein the first modulation is different from the second modulation. A convolutional interleaver may include multiple interleaver banks that depend on a periodic blockage of the transmitted superframes.

Some embodiments may also include receiving at least one superframe. The first known sequence or the second known sequences may be used to maintain a phase lock. Some embodiments may include freewheeling during a period when at least the first known sequence or the second known sequences are not present.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory module" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A system for efficient control signaling over shared communication channels, the system comprising:
   a gateway configured to encode and to transmit a plurality of physical layer headers, wherein:
      each physical layer header includes a plurality of modcode partitions, wherein:
         each modcode partition is associated with a respective modcode point associated with a respective physical layer header;
         the plurality of modcode partitions of the respective physical layer header are distributed within a data frame associated with the physical layer header; and
         at least a portion of the data frame including a modcode partition associated with the respective physical layer header is interleaved using a channel interleaver;
   a plurality of terminals, in wireless communication with the gateway via satellite, wherein the plurality of terminals are configured to:
      receive a digitized stream including the data frame;
      deinterleave at least the portion of the data frame including the modcode partition associated with the respective physical layer header using a channel deinterleaver; and
      decode the physical layer header associated with the data frame to determine the modcode point associated with the data frame.

2. The system for efficient control signaling over shared communication channels recited in claim 1, wherein the plurality of physical layer headers include at least a first physical layer header and a second physical layer header, wherein:
   the first physical layer header spans a first length and includes information representing a first modcode; and
   the second physical layer header spans a second length and includes information representing a second modcode, wherein the second length is longer than the first length.

3. The system for efficient control signaling over shared communication channels recited in claim 2, wherein the first physical layer header is of insufficient length for the second terminal to decode the first physical layer and for the second receiver to determine the first modcode associated with the first physical layer header.

4. The system for efficient control signaling over shared communication channels recited in claim 1, wherein the modcode point represents a modulation, a code rate, a spreading factor or a frame size.

5. The system for efficient control signaling over shared communication channels recited in claim 1, wherein each modcode partition is represented by at least a portion of a Walsh code.

6. The system for efficient control signaling over shared communication channels recited in claim 1, wherein the modcode partitions are distributed within the data frame at known locations.

7. The system for efficient control signaling over shared communication channels recited in claim 1, wherein the modcode partitions are distributed within the data frame such that the data frame is segmented into equal portions.

8. The system for efficient control signaling over shared communication channels recited in claim 1, wherein each modcode partition has the same length.

9. The system for efficient control signaling over shared communication channels recited in claim 1, wherein the modcode partitions are encoded according to a Reed-Muller code.

10. The system for efficient control signaling over shared communication channels recited in claim 1, wherein the modcode partitions are encoded using an orthogonal variable spread factor.

11. The system for efficient control signaling over shared communication channels recited in claim 1, wherein the modcode partitions are encoded according to an orthogonal code channel scheme.

12. A method for efficient control signaling over shared communication channels, the method comprising:
    determining a plurality of modcode points, wherein each modcode point represents at least a modulation, a code rate, and a spreading factor;
    determining a plurality of modcode partitions, wherein each respective modcode partition is associated with a respective modcode point from the plurality of modcode points;
    interleaving the plurality of modcode partitions using a channel interleaver;
    transmitting over a wireless channel a first plurality of first modcode partitions associated with a first modcode point and distributed within a first data frame and a second plurality of second modcode partitions associated with a second modcode point and distributed within a second data frame.

13. The method recited in claim 12, wherein the plurality of modcode partitions are based on a signal to noise ratio associated with the modcode point.

14. The method recited in claim 12, wherein:
    the first plurality of first modcode partitions is of sufficient length for a first receiver to decode the first plurality of modcode partitions and to determine the first modcode point associated with the first plurality of first modcode partitions; and
    the first plurality of first modcode partitions is of insufficient length for a second receiver to decode the first plurality of modcode partitions and to determine the first modcode point associated with the first plurality of first modcode partitions.

15. The method recited in claim 12, wherein each modcode partition is represented by at least a portion of a Walsh code.

16. The method recited in claim 12, further comprising spreading at least one of the modcode partitions.

17. The method recited in claim 12, wherein the first plurality of first modcode partitions are distributed within the data frame at known locations.

18. The method recited in claim 12, wherein the first plurality of first modcode partitions are distributed within the data frame such that the data frame is segmented into equal portions.

19. The method recited in claim 12, wherein each modcode partition of the plurality of modcode partitions has a same length.

20. The method recited in claim 12, wherein the second plurality of second modcode partitions is larger than the first plurality of first modcode partitions.

21. An adaptive coding, spreading, and modulating terminal to process a modcode signal from a received wireless signal, the terminal comprising:
    a receiver module configured to receive the wireless signal transmitted via a satellite;
    an A/D module, communicatively coupled with the receiver module, and configured to process the received wireless signal to generate a digitized stream of symbols comprising a modcode signal;
    a channel deinterleaver module, communicatively coupled with the A/D module, and configured to deinterleave the digitized stream of symbols comprising the modcode signal; and
    a modcode detector module, communicatively coupled with the channel deinterleaver module, and configured to determine a portion of the digitized stream of symbols comprising the deinterleaved modcode signal and determine a specific modcode from the modcode signal.

22. The terminal of claim 21, wherein the modcode detector module is further configured to:
    provide the modcode signal to one or more correlators, wherein the one or more correlators each has a respective length;
    examine one or more outputs from the one or more correlators, wherein at least one of the respective lengths of one or more correlators depends on a signal to noise ratio associated with the terminal; and
    determine a specific modcode from the modcode signal based on the one or more outputs from the one or more correlators.

23. The terminal of claim 21, further comprising:
    a demodulator module, communicatively coupled with the modcode detector module, and configured to:
    receive information regarding the specific modcode from the modcode detector; and
    demodulate a data portion of the received wireless signal based on the information regarding the specific modcode.

24. The terminal of claim 21, further comprising:
    a decoder module, communicatively coupled with the modcode detector module, and configured to:
    receive information regarding the specific modcode from the modcode detector; and
    decode the data portion of the received wireless signal based on the information regarding the specific modcode.

25. The terminal of claim 21, further comprising:
    a despreader module, communicatively coupled with the modcode detector module, and configured to:
    receive information regarding the specific modcode from the modcode detector; and
    despread the data portion of the received wireless signal based on the information regarding the specific modcode.

* * * * *